(12) United States Patent
Raman

(10) Patent No.: US 9,778,961 B2
(45) Date of Patent: Oct. 3, 2017

(54) EFFICIENT SCHEDULING OF MULTI-VERSIONED TASKS

(71) Applicant: QUALCOMM Incorporated, San Diego, CA (US)

(72) Inventor: Arun Raman, Fremont, CA (US)

(73) Assignee: QUALCOMM Incorporated, San Diego, CA (US)

(*) Notice: Subject to any disclaimer, the term of this patent is extended or adjusted under 35 U.S.C. 154(b) by 134 days.

(21) Appl. No.: 14/852,737

(22) Filed: Sep. 14, 2015

(65) Prior Publication Data

US 2017/0075734 A1    Mar. 16, 2017

(51) Int. Cl.
| | |
|---|---|
| G06F 9/46 | (2006.01) |
| G06F 9/52 | (2006.01) |
| G06F 9/50 | (2006.01) |
| G06F 9/48 | (2006.01) |

(52) U.S. Cl.
CPC .............. *G06F 9/52* (2013.01); *G06F 9/4881* (2013.01); *G06F 9/5038* (2013.01); *G06F 9/5066* (2013.01)

(58) Field of Classification Search
None
See application file for complete search history.

(56) References Cited

U.S. PATENT DOCUMENTS

| | | |
|---|---|---|
| 7,886,172 B2 | 2/2011 | Bose et al. |
| 8,276,164 B2 | 9/2012 | Munshi et al. |
| 8,468,507 B2 | 6/2013 | Agarwal et al. |
| 8,510,741 B2 | 8/2013 | Leiserson et al. |
| 8,533,716 B2 | 9/2013 | Lippett |
| 8,566,537 B2 | 10/2013 | Ni et al. |
| 8,572,622 B2 | 10/2013 | Alexander et al. |
| 8,707,314 B2 | 4/2014 | Gummaraju et al. |
| 8,782,645 B2 | 7/2014 | Breternitz et al. |

(Continued)

OTHER PUBLICATIONS

Benini L., et al., "Allocation, Scheduling and Voltage Scaling on Energy Aware MPSoCs," Integration of AI and OR Techniques in Constraint Programming for Combinatorial Optimization Problems, Lecture Notes in Computer Science, 2006, vol. 3990, 15 pages.

(Continued)

*Primary Examiner* — Gregory A Kessler
(74) *Attorney, Agent, or Firm* — The Marbury Law Group, PLLC

(57) ABSTRACT

Methods, devices, systems, and non-transitory process-readable storage media for a multi-processor computing device to schedule multi-versioned tasks on a plurality of processing units. An embodiment method may include processor-executable operations for enqueuing a specialized version of a multi-versioned task in a task queue for each of the plurality of processing units, wherein each specialized version is configured to be executed by a different processing unit of the plurality of processing units, providing ownership over the multi-versioned task to a first processing unit when the first processing unit is available to immediately execute a corresponding specialized version of the multi-versioned task, and discarding other specialized versions of the multi-versioned task in response to providing ownership over the multi-versioned task to the first processing unit. Various operations of the method may be performed via a runtime functionality.

25 Claims, 14 Drawing Sheets

(56) References Cited

U.S. PATENT DOCUMENTS

| | | |
|---|---|---|
| 8,892,931 B2 | 11/2014 | Kruglick |
| 8,954,986 B2 | 2/2015 | Rajagopalan et al. |
| 2008/0276262 A1 | 11/2008 | Munshi et al. |
| 2012/0263125 A1 | 10/2012 | Tejaswini et al. |
| 2013/0179881 A1* | 7/2013 | Calder .................. G06F 9/5072 718/1 |
| 2014/0006666 A1 | 1/2014 | Hiraki et al. |
| 2014/0282595 A1 | 9/2014 | Lev et al. |
| 2015/0067700 A1 | 3/2015 | Kim et al. |
| 2015/0089249 A1 | 3/2015 | Hannon et al. |
| 2017/0060633 A1 | 3/2017 | Suarez et al. |
| 2017/0083364 A1 | 3/2017 | Zhao et al. |
| 2017/0083365 A1 | 3/2017 | Zhao et al. |

OTHER PUBLICATIONS

Fisher N., et al., "Thermal-Aware Global Real-Time Scheduling on Multicore Systems," Feb. 3, 2010, 45 pages.

Shankar S., et al., "Power-Aware Work Stealing in Homogeneous Multicore Systems," Future Computing 2014: The Sixth International Conference on Future Computational Technologies and Applications, 2014, pp. 40-49.

International Search Report and Written Opinion—PCT/US2016/046385—ISA/EPO—Nov. 11, 2016.

\* cited by examiner

// Pseudocode

```
// scheduling algorithm                                                         522
schedule(task) // input: "task" (i.e., a pointer to task to be scheduled)
{
        if (!task->has_alternatives())                                          524
        {
                //there are no alternatives, so this is a normal task
                //(i.e. not a multi-versioned task)
                task_queue_list->push_task(task);
        }
        else
        {                                                                       526
                // is a multi-versioned task
                int i = 1; // alternative number
                for_each (task t : task->alternatives)
                {
                        // encode alternative number in task pointer to make t_alt
                        t_alt = task | i;
                        //enqueue the alternative task pointer in appropriate queue
                        task_queue_list->push_task(t_alt);
                        //increment alternative task version counter
                        i++;
                }

// now push main task pointer on queue
                task_queue_list->push_task(task);
        }
}
```

```
// queue push function addressing each processing unit of system               528
task_queue_list->push_task(task)
{
        auto t = task & task_mask; // mask out alternative encoding if (t->is_big()) //task 't' is specialized for big core in big.LITTLE core
                bq.push(task);//task pushed onto queue for big core in big.LITTLE core
        else if (t->is_little()) //task 't' is specialized for little core in big.LITTLE core
                lq.push(task);//task pushed onto queue for little core in big.LITTLE core
        else if (t->is_gpu()) //task 't' is specialized for GPU
                gq.push(task);//task pushed onto queue for GPU
        else if (t->is_dsp()) //task 't' is specialized for DSP
                dq.push(task);//task pushed onto queue for DSP
}
```

FIG. 5B

```
// Pseudocode to be performed by each processing unit                                    ┌─700

//task execution algorithm
task ta = queue.dequeue();//remove the next pointer for a task to be performed
auto t = ta & task_mask; // mask out alternative encoding to get task 't'           702
auto alternative_num = ta & alternative_mask; // get alternative number if (!t->has_alternatives)
{
    //task 't' has no alternatives (t is not a multi-versioned task)
    //so execute on processing unit                                                  704
    execute(t);
}
else
{
    //task 't' is a multi-versioned task                                             706
    //see if processing unit can get "ownership" over task 'ta'
    //(i.e., is 't' to be executed by this processing unit or another?)
    if ( t->request_ownership())
    {
        // processing unit succeeded in acquiring ownership                          708
        //so, it's alternative version will be dynamically dispatched/ executed if (alternative_num > 0)
        {
            // get alternative task version of the main task
            //       associated with processing unit
            task alternative_task = t->get_alternatives()[alternative_num];

// set main task to finish after this alternative task
            //(e.g., set multi-versioned task to finish when
            //       one alternative completes)
            t->finish_after(alternative_task);

//execute the particular alternative version
            execute(alternative_task);
        }
    }
    else
    {                                                                                710
        // processing unit failed to acquire ownership of main multi-versioned task
        // i.e., some other processing unit has already begun
        //       execution on a specialized version of the multi-versioned task
        // SO, do not execute specialized version of the multi-versioned task
        //       with this processing unit
    }
}
```

FIG. 7

EFFICIENT SCHEDULING OF MULTI-VERSIONED TASKS

BACKGROUND

Parallel programming is a technique for computing devices to split computations into small chunks of work (referred to as tasks) in order to provide responsive and high performance software. In a multi-core or multi-processor computing device (e.g., a heterogeneous system-on-chip (SOC)), different tasks may be assigned to (or offloaded to) various processing units of the device, with some tasks being specified to run after others finish due to task dependencies. Typically, a runtime engine (or task scheduler) determines to which processing unit a task may be assigned, and such determinations may typically be based on various device, processing unit, and/or task characteristics or conditions.

Some tasks may be directed to or designed for particular processing units. For example, a first task may be designed for execution by a central processing unit (CPU), a second task may be designed for execution on a graphics processing unit (GPU), and a third task may be designed for execution on a digital signal processor (DSP). Tasks meant for different processing units are often written in different programming languages or using different specifications. For example, the code to implement a vector addition calculation as a CPU task and the code to implement a matrix multiplication calculation as a GPU task may use different languages and/or syntax. To capitalize upon the different processing units in a computing device, different versions of common general-purpose tasks may be concurrently supported. A "multi-versioned" task may be associated with or otherwise include multiple implementations of the same logical function or routine, with each implementation specialized for execution by a particular processing unit. For example, a vector addition calculation may be implemented as a CPU task and a GPU task that both use different languages and/or syntax.

SUMMARY

Various embodiments provide methods, devices, systems, and non-transitory process-readable storage media for a multi-processor computing device to schedule multi-versioned tasks on a plurality of processing units. In some embodiments, a method performed by a processor of a multi-processor computing device may include enqueuing a specialized version of a multi-versioned task in a task queue for each of the plurality of processing units in which each specialized version may be configured to be executed by a different processing unit of the plurality of processing units, providing ownership over the multi-versioned task to a first processing unit of the plurality of processing units in which the first processing unit may be available to immediately execute a first specialized version of the multi-versioned task before other processing units of the plurality of processing units are available to execute other specialized versions of the multi-versioned task, and discarding the other specialized versions of the multi-versioned task in response to providing the ownership over the multi-versioned task to the first processing unit. In some embodiments, the multi-processor computing device may be executing a runtime functionality configured to schedule the plurality of processing units.

In some embodiments, enqueuing the specialized version of the multi-versioned task in the task queue for each of the plurality of processing units may include enqueuing a pointer associated with the specialized version of the multi-versioned task in the task queue for each of the plurality of processing units. In some embodiments, each pointer may include an identification of the multi-versioned task and the specialized version of the multi-versioned task. In some embodiments, the identification of the specialized version of the multi-versioned task may be included in a lowest four bits of each pointer. In some embodiments, providing the ownership over the multi-versioned task to the first processing unit of the plurality of processing units may include storing data in association with the multi-versioned task.

Some embodiments may further include determining whether a next task from the task queue of the first processing unit is associated with the multi-versioned task, and requesting the ownership over the multi-versioned task for the first processing unit in response to determining that the next task is associated with the multi-versioned task. Some embodiments may further include acquiring the ownership over the multi-versioned task for the first processing unit in response to requesting the ownership, and executing the next task in response to acquiring the ownership over the multi-versioned task for the first processing unit. In some embodiments, determining whether the next task from the task queue of the first processing unit is associated with the multi-versioned task may include obtaining an identifier by applying a bit mask to a pointer from the task queue of the first processing unit, and determining that the next task is associated with the multi-versioned task in response to determining that the identifier corresponds to the first specialized version of the multi-versioned task.

In some embodiments, determining whether the next task from the task queue of the first processing unit is associated with the multi-versioned task may include retrieving a pointer from the task queue of the first processing unit, wherein the pointer is a common multi-versioned task pointer placed in the task queue for each of the plurality of processing units, determining whether the pointer is associated with a list of specialized versions of the multi-versioned task, and identifying the first specialized version of the multi-versioned task from the list of specialized versions of the multi-versioned task in response to determining that the pointer is associated with the list of specialized versions of the multi-versioned task, wherein the first specialized version may be the next task to be executed by the first processing unit.

Some embodiments may further include executing the next task in response to determining that the next task is not associated with the multi-versioned task. Some embodiments may further include determining that the ownership over the multi-versioned task has been acquired by a second processing unit in response to requesting the ownership for the first processing unit, and discarding the next task in response to determining that the ownership over the multi-versioned task has been acquired by the second processing unit. Some embodiments may further include determining whether there is a priority task within the task queue associated with the first processing unit, and executing, via the first processing unit, the priority task, in which requesting the ownership over the multi-versioned task for the first processing unit in response to determining that the next task is associated with the multi-versioned task may include requesting the ownership over the multi-versioned task for the first processing unit in response to executing the priority task. In some embodiments, the processor may be the first processing unit.

Further embodiments include a computing device configured with processor-executable instructions for performing operations of the methods described above. Further embodiments include a computing device including means for performing functions of the methods described above. Further embodiments include a non-transitory processor-readable medium on which is stored processor-executable instructions configured to cause a computing device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the claims.

FIGS. 5A-5B are diagrams illustrating pseudocode for routines performed by a multi-processor computing device to create and schedule (or dispatch) specialized versions of multi-versioned tasks according to various embodiments.

FIG. 7 is a diagram illustrating pseudocode for routines performed by a multi-processor computing device to execute specialized versions of multi-versioned tasks according to various embodiments.

DETAILED DESCRIPTION

Figure 1:
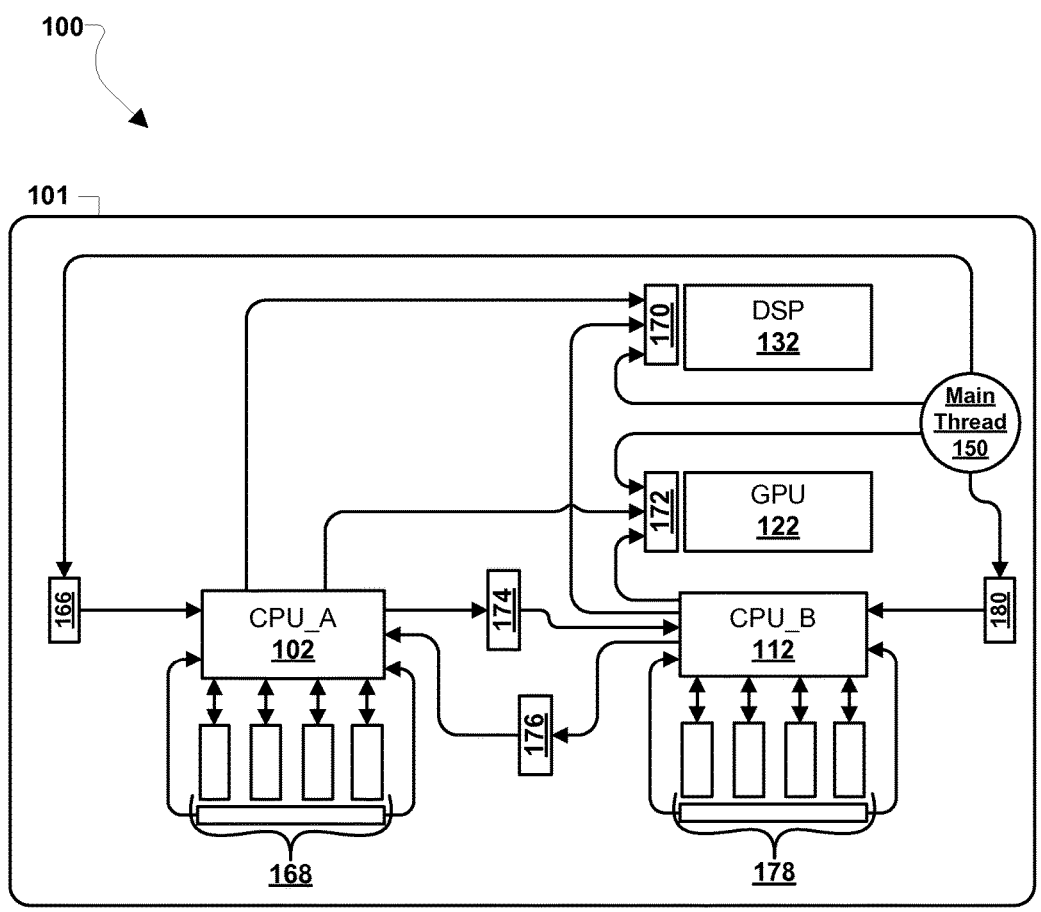
FIG. 1 is a component block diagram illustrating task queues and processing units of an exemplary multi-processor computing device (e.g., a heterogeneous system-on-chip (SoC)) suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to an electronic device equipped with at least a processor. Examples of computing devices may include mobile devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with various memory and/or data storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

The term "multi-processor computing device" is used herein to refer to computing devices configured with two or more processing units. Multi-processor computing devices may execute various tasks (e.g., routines, functions, calculations, instruction sets, etc.) using two or more processing units. For example, a multi-processor computing device may be a heterogeneous computing device (e.g., a system-on-chip (SoC)) with different processing units each configured to perform specialized and/or general-purpose workloads. Such processing units may include various processor devices, a core, a plurality of cores, etc. For example, processing units of a multi-processor computing device may include an application processor(s) (e.g., a CPU) and/or specialized processing devices, such as a GPU and a DSP, any of which may include one or more internal cores.

Various embodiments provide methods, devices, systems, and non-transitory process-readable storage media for efficiently scheduling and executing particular (or specialized) versions of multi-versioned tasks by a multi-processor computing device. As an overview of the various embodiments, when a multi-versioned task (e.g., a general-purpose task having more than one supported implementation or version) is to be executed, a specialized version of the multi-versioned task may be enqueued for each supported processing unit (e.g., CPU, GPU, DSP, etc.). For example, if multiple versions of a matrix multiplication general-purpose task are available for use with a CPU and a GPU, the computing device may enqueue the CPU specialized version in the CPU's task queue as well as enqueue the GPU specialized version in the GPU's task queue. Such enqueuing may include placing a pointer in the task queue for each processing unit having a supported version (e.g., a pointer indicating both the multi-versioned task and the specialized version). As the processing units execute tasks within corresponding task queues, eventually a first processing unit may become available to immediately execute a first specialized version of the multi-versioned task. The first processing unit may acquire an ownership over the multi-versioned task, such as by making an application programmer interface (API) call for requesting ownership over the multi-versioned task. Once acquired by the first processing unit, any other processing unit subsequently requesting ownership over the particular multi-versioned task may not receive the ownership and thus may not execute corresponding specialized versions of the multi-versioned task. Instead, these other processing units may simply dequeue and discard specialized version pointers and proceed to process other tasks without waiting.

With the multi-versioned task owned by the first processing unit, the multi-processor computing device may configure the multi-versioned task to finish after the processing unit completes execution of the first specialized version. For example, the first processing unit may execute a "finish_after( )" API call. Such a "finish after" operation may guarantee that the multi-versioned task is marked as finished in response to the first processing unit finishing execution of the first specialized version. This may ensure that the task dependencies, waits, and lifetime of all versions of the multi-versioned task are tied together. In other words, the main multi-versioned task may be automatically fulfilled by the completion of one specialized version. In this way, "late-binding" techniques are provided to allow multi-versioned tasks to be completed by the processing units that are the fastest to be available to actually execute specialized versions.

In some embodiments there may be no need to explicitly place any indication of specialized versions in task queues of processing units. Instead, the multi-processor computing device may implement multi-versioned techniques by placing a common multi-versioned task pointer in the task queues of all processing units supported by the multi-versioned task (i.e., all processing units for which there are specialized versions of the multi-versioned task). For example, a DSP may dequeue a task pointer and acquire ownership over the task. The DSP may check whether the task has alternatives (i.e., whether there are more than one specialized versions of the task). If there are alternatives, the task may be identified as a multi-versioned task, and the DSP may scan a list of alternatives (or specialized versions) of the multi-versioned task and execute a corresponding specialized version for DSPs.

In some embodiments, the multi-processor computing device may perform an algorithm that determines whether a task to be executed is a multi-versioned task. If a task is not a multi-versioned task, the task may be enqueued in a processing unit's task queue for typical execution. However, if the task is a multi-versioned task, the multi-processor computing device may create pointers for all supported (or requested) specialized versions of the multi-versioned task (e.g., one for GPU, CPU, DSP, etc.), placing the pointers in task queues corresponding to the appropriate processing units. For example, the pointer for a DSP version of a matrix multiplication task may be entered into the DSP's task queue, etc. In some cases, processing unit identities or other version associations may be stored in the pointers themselves, such as encoding core identifiers (IDs) in the lowest four (4) bits of a pointer. In some embodiments, when a multi-versioned task is launched for execution, the task may be considered for scheduling either when it becomes ready (e.g., when it has no predecessor dependencies) or sooner if the task is subject to scheduling optimizations.

In some embodiments, a multi-versioned task may be created through an API call, indicating the task, arguments, and potential processing units (e.g., cores) that may execute specialized versions of the multi-versioned task. The multi-versioned task may be created by the programmer, compiler, or runtime system. In some embodiments, the order in which the specialized versions are presented in the API call may indicate relative preference or priority. For each specialized version (or implementation) in such an API call, the multi-processor computing device (e.g., via a runtime functionality) may create a task (or task pointer) to be enqueued in a supported processing unit's task queue. For example, specialized versions of a matrix multiplication task tailored for execution by either a CPU or a GPU may be enqueued in appropriate task queues in response to an API call invoked by a programmer within code or by a compiler/runtime system.

In various embodiments, a specific processing unit may be configured to process enqueued tasks (or task pointers) via an associated thread in a thread pool. For example, a DSP thread may dequeue a pointer for a specialized version of a multi-versioned task from the DSP's task queue. The following is a non-limiting illustration of operations by such a thread. A thread associated with a DSP may perform operations to determine whether dequeued tasks (or pointers) are associated with multi-versioned tasks or not, such as by applying a mask to identify any version numbers within the pointer bits. If the dequeued task is not related to a multi-version task, the thread for the DSP may simply execute the dequeued task. However, if the dequeued task (or pointer) is related to a multi-versioned task, the DSP thread may request ownership over the multi-versioned task, thus seeing whether any other thread has already acquired ownership for the multi-versioned task. If ownership is acquired, the DSP thread may set the multi-versioned task (or request that the multi-versioned task be set) to finish after execution of the specialized version task associated with the DSP, and may execute that specialized version. If the dequeued task is multi-versioned but ownership cannot be acquired by the thread, the DSP thread may simply discard the dequeued task (e.g., a deqeued task pointer for the task), and process any other tasks in the task queues associated with the DSP thread.

The processing units of the multi-processor computing device may each be natively associated with particular types of tasks. For example, the GPU may primarily be used within an SoC mobile device to perform operations for rendering graphics that may be displayed on a touch screen, etc. Primary functions of the computing device may suffer if the processing units fail to properly prioritize native operations, such as due to parallel processing scheduling. In some embodiments, a processing unit of the multi-processor computing device may be configured to evaluate tasks within a task queue to identify any priority tasks that should be executed before any specialized versions of multi-versioned tasks. For example, although the next task to be dequeued and executed at a GPU may be a version of a matrix multiplication task, the GPU may first execute a high-priority rendering/display task that is behind the version task in the queue. In this way, it may be possible for the processing unit to lose an opportunity to acquire ownership over a specialized version of a multi-versioned task, as another processing task may become available for the multi-versioned task as the processing unit executes the priority task. For example, a DSP may acquire the ownership over a multi-versioned task while a GPU completes a display operation before requesting ownership over the multi-versioned task. By prioritizing native workloads over general-purpose multi-versioned tasks, the processing units may maintain priority, native capabilities (e.g., rendering, signal processing, etc.) while still competing to execute multi-versioned tasks.

The "late-binding" scheduling techniques described herein do not assess the relative load on the processing units at assignment time, and thus ensure that the processing unit that is actually the fastest to get to a multi-versioned task gets to execute a corresponding version of the task. For example, even if a DSP's task queue has fewer work items enqueued than a GPU at a first time, the multi-processor computing device implementing embodiment techniques may allow a faster GPU to execute a corresponding specialized version of a multi-versioned task at a second time. Thus, the embodiment techniques are beneficial for improving the overall efficiency of resource consumption (e.g., memory, processing units, etc.), load-balancing, and thermal management of a multi-processor computing device. For example, by providing a late-binding for versions of multi-versioned tasks, the embodiment techniques may decrease hotspots for executions in the multi-processor computing device, allowing for higher processing in the total computing system as no individual processing unit may be disproportionately overworked.

By enabling processing units to acquire the right to execute specialized versions of general-purpose, multi-versioned tasks only when actually available to begin immediate execution, the embodiment techniques provide just-in-time scheduling of tasks. In this way, the embodiment techniques do not rely upon potentially inaccurate and costly computations and/or measurements to identify the best processing unit to run every multi-versioned task. Instead, processing units are configured to compete to execute specialized versions of multi-versioned tasks, thereby spreading workloads throughout the computing device based on an actual ability to start executing tasks. Such techniques naturally account for unforeseen operating conditions that may or may not be accounted for with typical multi-version scheduling schemes, resulting in greater performance, lower energy consumption, and lower memory consumption.

The embodiment techniques are distinct from conventional schemes, such as conventional techniques that may calculate current workloads or predict likely workloads and/or capabilities of processing units in order to choose to which processing unit a task may be assigned. Such conventional schemes may often fail to account for dynamic events that may be encountered by processing units during executing of tasks, such as data loads from memory that may affect projected execution times. Some conventional schemes may also use profiles or other precomputed data to perform a priori predictions of best destinations for tasks. Conversely, the embodiment techniques dispatch multiple versions concurrently and allow processing units to compete for ownership of the common multi-versioned task. In other words, the embodiment techniques do not use a predefined priority, cost, and/or prediction models for assigning specialized versions of multi-versioned tasks, but instead make execution assignments based on the processing unit that first becomes available to actually execute a multi-versioned task.

Further, unlike some conventional schemes, the embodiment techniques do not require virtual memory address space considerations or special task queues. In particular, some conventional schemes may utilize a special task queue from which all processing units may steal multi-versioned tasks. Such special queue schemes may not be feasible for open-ended scheduling in systems with finite resources, as countless queues may be required to accommodate tasks with different combinations of supported implementations. For example, a first multi-versioned task may have only CPU and GPU implementations, a second multi-versioned task may have CPU, GPU, and DSP implementations, and a third multi-versioned task may contain multiple CPU implementations), each requiring a separate special task queue. Such conventional techniques may require processing units to scan each special task queue to identify any tasks that may be assigned and executed on the processing units. The embodiment techniques are more efficient than such conventional schemes, and require only as many task queues as are necessary for single-version tasks.

In various embodiments, the multi-processor computing device may execute one or more runtime functionalities (e.g., a runtime service, routine, thread, logic, or other software element, etc.) to perform various operations for scheduling or dispatching tasks, multi-versioned or otherwise. Such a runtime functionality may include a dedicated runtime functionality that may be executed by a processor of the computing device, such as a general-purpose or applications processor configured to execute operating systems, services, and/or other system-relevant software. For example, a runtime functionality executing on an application processor may be configured to provide ownership to a processing unit for executing a specialized version of a multi-versioned task. Other runtime functionalities may also be used, such as dedicated functionalities for handling tasks at individual processing units.

FIG. 1 is a diagram 100 illustrating various components of an exemplary multi-processor computing device 101 (e.g., a heterogeneous system-on-chip (SoC) device) suitable for use with various embodiments. The multi-processor computing device 101 may include a plurality of processing units, such as a first CPU 102 (referred to as "CPU_A" 102 in FIG. 1), a second CPU 112 (referred to as "CPU_B" 102 in FIG. 1), a GPU 122, and a DSP 132. In some embodiments, the multi-processor computing device 101 may utilize an "ARM big.Little" architecture, and the first CPU 102 may be a "big" processing unit having relatively high performance capabilities but also relatively high power requirements, and the second CPU 112 may be a "little" processing unit having relatively low performance capabilities but also relatively low power requirements than the first CPU 102.

The multi-processor computing device 101 may be configured to support parallel-processing, work sharing, and/or work "stealing" between the various processing units 102, 112, 122, 132. In particular, any combination of the processing units 102, 112, 122, 132 may be configured to create and/or receive discrete work items (e.g., tasks) for execution. Each of the processing units 102, 112, 122, 132 may utilize one or more queues (or task queues) for temporarily storing and organizing tasks (and/or data associated with tasks) to be executed by the processing units 102, 112, 122, 132. For example and with reference to FIG. 1, the first CPU 102 may retrieve tasks from task queues 166, 168, 176 for local execution by the first CPU 102 and may place tasks in queues 170, 172, 174 for execution by other devices; the second CPU 112 may retrieve tasks from queues 174, 178, 180 for local execution by the second CPU 112 and may place tasks in queues 170, 172, 176 for execution by other devices; the GPU 122 may retrieve tasks from queues 172; and the DSP 132 may retrieve tasks from queues 170. In some embodiments, some task queues 170, 172, 174, 176 may be so called multi-producer, multi-consumer queues; some task queues 166, 168, 178, 180 may be so called single-producer, multi-consumer queues; while yet other task queues may be so called single-producer, single-consumer queues. In some cases, tasks may be generated based on indicators within code, such as designations by programmers of workloads that split certain computations. Further, any combination of the processing units 102, 112, 122, 132 may typically be capable of identifying tasks within workloads that may be submitted for distribution by the runtime functionality.

In some embodiments, a runtime functionality (e.g., runtime engine, task scheduler, etc.) may be configured to determine destinations for dispatching tasks to the processing units 102, 112, 122, 132. For example, in response to identifying a new general-purpose task that may be offloaded to any of the processing units 102, 112, 122, 132, the runtime functionality may identify the best processing unit(s) for executing the task and may dispatch the task accordingly. Such a runtime functionality may be executed on an application processor or main processor, such as the first CPU 102. In particular, the runtime functionality may be performed via one or more operating system-enabled threads (e.g., "main thread" 150). For example, based on determinations of the runtime functionality, the main thread 150 may provide task data to various task queues 166, 170, 172, 180.

In some embodiments, each processing unit 102, 112, 122, 132 may be capable of providing tasks to one another. For example, the DSP 132 may create tasks for the first CPU 102, the second CPU 112, and/or the GPU 122 and vice versa. As another example, the GPU 122 may create tasks for the first CPU 102, the second CPU 112, and/or the DSP 132 and vice versa.

Figure 2A:
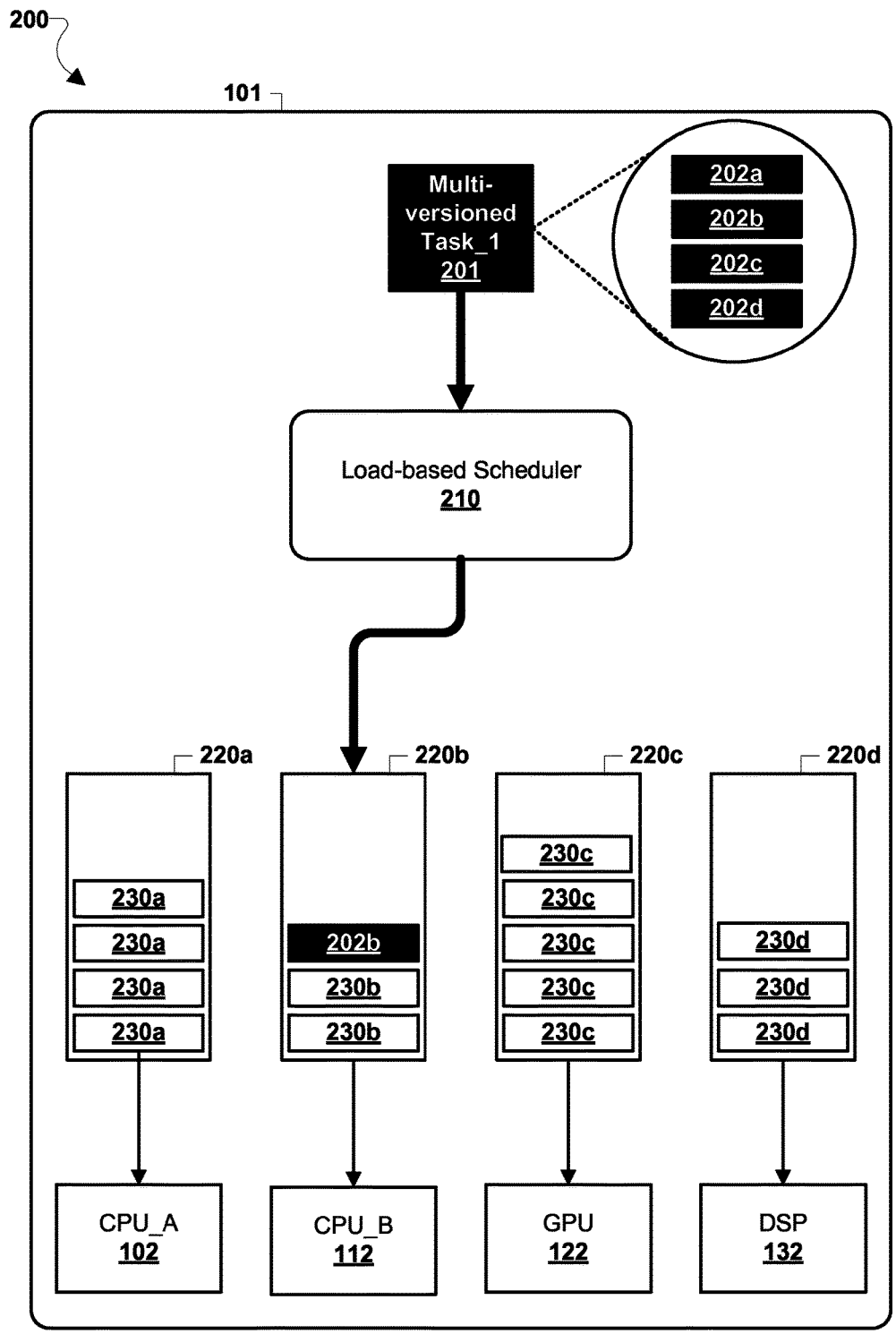
FIGS. 2A-2B are component block diagrams illustrating conventional early-binding of specialized versions of a multi-versioned task.
Figure 2B:
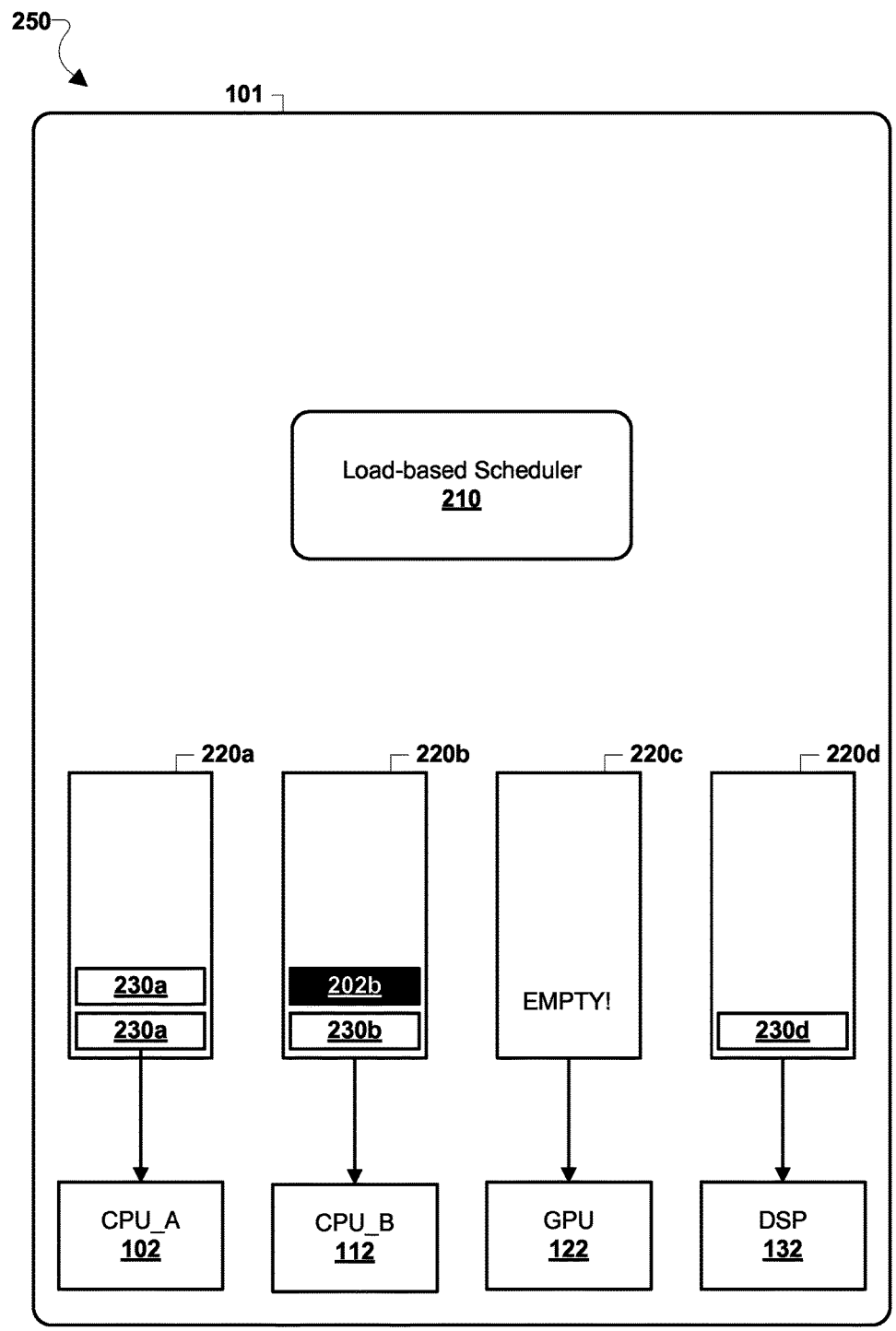

FIGS. 2A-2B illustrate a scenario in which a multi-processor computing device (e.g., a heterogeneous system-on-chip (SoC) device) performs a conventional "early-binding" of a specialized version of a multi-versioned task. Typically, conventional task scheduling for a multi-versioned task may identify, a priori, a processing unit predicted to best be available or able to perform a particular version of the multi-versioned task. Such early-binding techniques often evaluate the load present on the applicable processing units (e.g., cores) at the time of scheduling, such as by evaluating the number of tasks in a task queue, the task size, and other factors that affect the speed and/or efficiency of the processing units. In other words, the processing unit with the lightest load at the time of scheduling may be assigned a task. For example, in response to determining that a GPU's current task queue includes fewer work items than the task queues of the CPU and DSP at an evaluation time, a scheduler may assign a version of a multi-versioned task to the GPU instead of to a CPU or a DSP. These evaluations (or predictions) may occur in advance of when the assigned processing unit is actually available to execute the specialized version of a multi-versioned task.

However, due to differences in the execution speeds and various runtime conditions, such as input to the program and the availability of computational resources, a priori assignments of tasks to processing units based on current or predicted load evaluations may be suboptimal. For example, even though a version of a multi-versioned task may be assigned to a little CPU that has fewer tasks in a related task queue than in a GPU's task queue, the GPU may finish more tasks faster than the little CPU due to the latter's relatively weak computational power (e.g., lower frequency, instructions-per-cycle, etc.). Thus, the GPU could have executed the multi-versioned task before the little CPU. Such conventional scheduling techniques may be short-sighted and adversely affect overall system performance.

Conventional early-binding techniques may be additionally problematic with multi-versioned tasks because assignments of specialized versions may not be re-assigned for dynamic load balancing. In particular, "work stealing" policies that enable available processing units with no work items in corresponding task queues to take work items from other task queues may not be applicable as specialized versions in task queues may only be executed on particular types of processing units. For example, a DSP that is available to work may not be able to take a specialized version of a multi-versioned task from the task queue of a CPU as that specialized task is specially-configured for the CPU.

FIG. 2A includes a diagram 200 illustrating an exemplary early-binding scheduling (or dispatching) of a particular version of a multi-versioned task 201 (referred to as "Task 1" in FIG. 2A) by a multi-processor computing device 101 at a first time. The multi-versioned task 201 may be a general-purpose task, such as a computation that various processing units may be capable of executing (e.g., matrix multiplication calculation, etc.). The multi-versioned task 201 may include or otherwise be associated with a plurality of specialized versions of the multi-versioned task 201 that are each configured to accomplish a common computation, process, and/or function. For example, the multi-versioned task 201 may include a first specialized version 202a configured for execution on a first CPU 102 (referred to as "CPU_A" in FIGS. 2A-2B), a second specialized version 202b configured for execution on a second CPU 112 (referred to as "CPU_B" in FIGS. 2A-2B), a third specialized version 202c configured for execution on a GPU 122, and a fourth specialized version 202d configured for execution on a DSP 132.

At an arbitrary first time, a conventional load-based scheduler module 210 configured to schedule tasks based on current workloads of the processing units 102, 112, 122, 132 may determine that the multi-versioned task 201 is ready to be scheduled for execution. The load-based scheduler module 210 may be a scheduler functionality executed via a thread via an application processor that receives and dispatches new tasks for execution by the processing unit having the least workload (e.g., fewest number of queues tasks). For simplicity, the load-based scheduler module 210 is shown in FIGS. 2A-2B as a single module (e.g., software, component(s), instructions, routine(s), logic, etc.) that is configured to be executed via a thread (e.g., main thread 150). However, the load-based scheduler module 210 may represent or otherwise include functionalities that may or may not be enabled by a single (or main) thread. For example, in some embodiments, the load-based scheduler module 210 may be comprised of logic, components, routines, instructions, and/or other functionalities that are executed and enabled across multiple threads in the multi-processor computing device 101.

The load-based scheduler module 210 may evaluate the operating states of the plurality of processing units 102, 112, 122, 132, such as by identifying the processing unit currently having the fewest number of tasks currently queued to be processed. For example, regarding the illustration in FIG. 2A, the load-based scheduler module 210 may identify that at the first time a first task queue 220a associated with the first CPU 102 may have four tasks 230a queued, a second task queue 220b associated with the second CPU 112 may have two tasks 230b queued, a third task queue 220c associated with the GPU 122 may have five tasks 230c queued, and a fourth task queue 220d associated with the DSP 132 may have three tasks 230d queued. Based on the number of currently queued tasks in the task queues 220a-220d, the load-based scheduler module 210 may identify the second CPU 112 as the appropriate processing unit to execute a version of the multi-versioned task 201 due to the second task queue 220b having the fewest currently queued tasks 230b. The load-based scheduler module 210 may assign the multi-versioned task 201 to the second CPU 112 by placing the second specialized version 202b (or a representation of the second specialized version 202b) in the second task queue 220b.

However, as different processing units 102, 112, 122, 132 may perform operations at different rates and/or may be affected by various unforeseen factors or conditions after tasks are assigned by the load-based scheduler module 210, the multi-versioned task 201 may be sub-optimally executed by the multi-processor computing device 101. For example, determinations of the load-based scheduler module 210 may fail to consider dynamic device operating conditions that may occur and subsequently affect the speed at which work items are executed by processing units, the complexity of work items to be performed, etc. Some conditions that may eventually cause different processing units 102, 112, 122, 132 to become available (or unavailable) before other processing units may or may not be predictable or measured, such as random device failures or inefficiencies. In other words, predicting and/or measuring the processing abilities of the processing units 102, 112, 122, 132 may be inaccurate and/or imprecise and thus may result in sub-optimal task assignments.

FIG. 2B includes a diagram 250 illustrating such an inefficient condition of the computing device 101 at a second time due to the conventional early-binding scheduling shown in FIG. 2A. In particular, after a period of time during which the processing units 102, 112, 122, 132 process the tasks within corresponding task queues 220a-220d, the GPU 122 may become available and thus inactive due to an empty task queue 220c. Further, despite the load determination by the load-based scheduler module 210 at the first time, the second specialized version 202b of the multi-versioned task 201 has yet to begin execution by the second CPU 112 at the second time. In other words, despite having the fewest tasks in a task queue 220b at the first time, the second CPU 112 was not the eventual best choice for executing the multi-versioned task 201, as the GPU 122 became available at the second time while the second CPU 112 was unable to begin execution of the second specialized version 202b. Thus, due to the obvious limitations of conventional a priori "early-binding" policies, there is an opportunity to improve multi-versioned task scheduling within multi-processor computing devices.

Figure 3A:
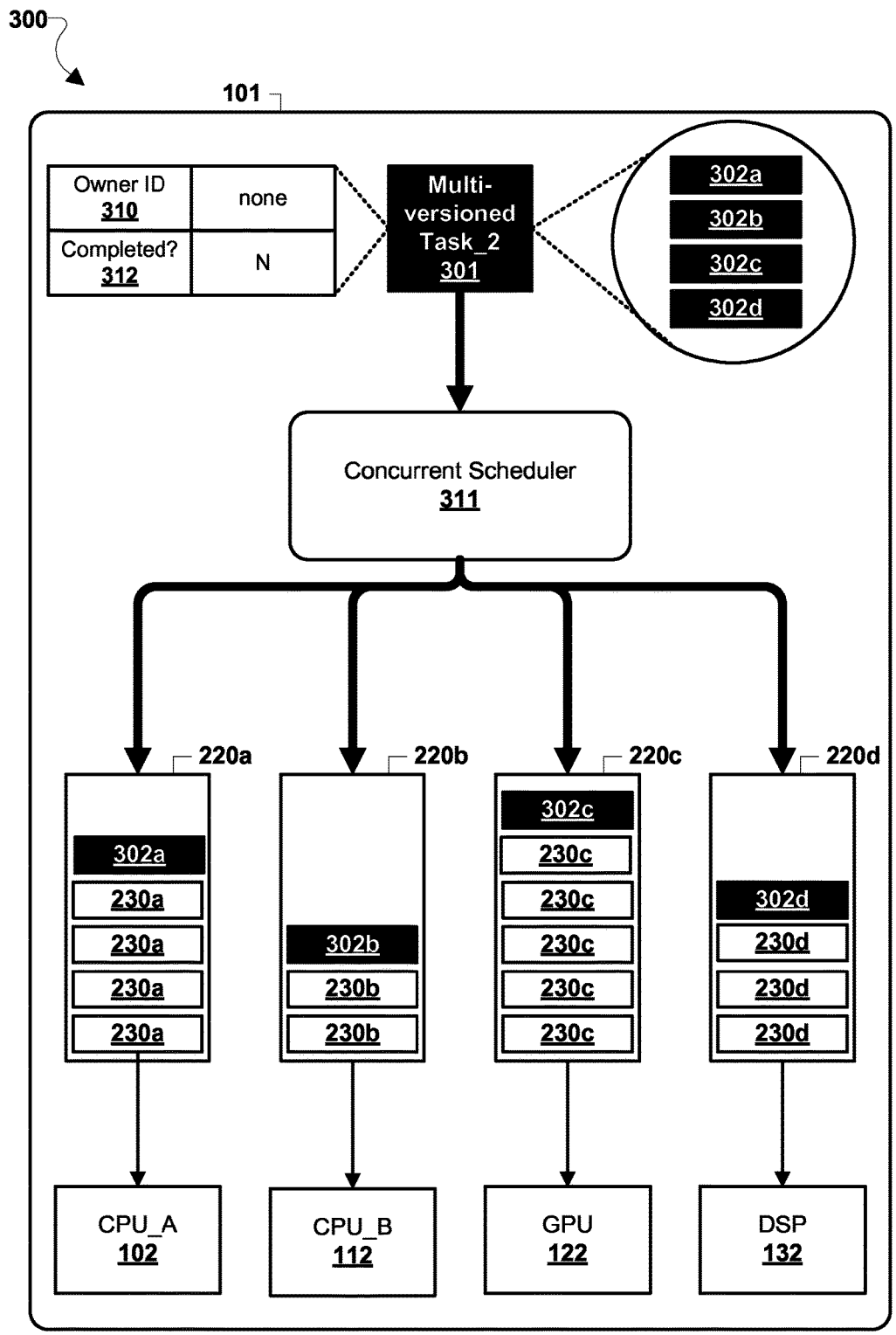
FIGS. 3A-3C are component block diagrams illustrating exemplary late-binding of specialized versions of a multi-versioned task by a multi-processor computing device according to various embodiments.
Figure 3B:
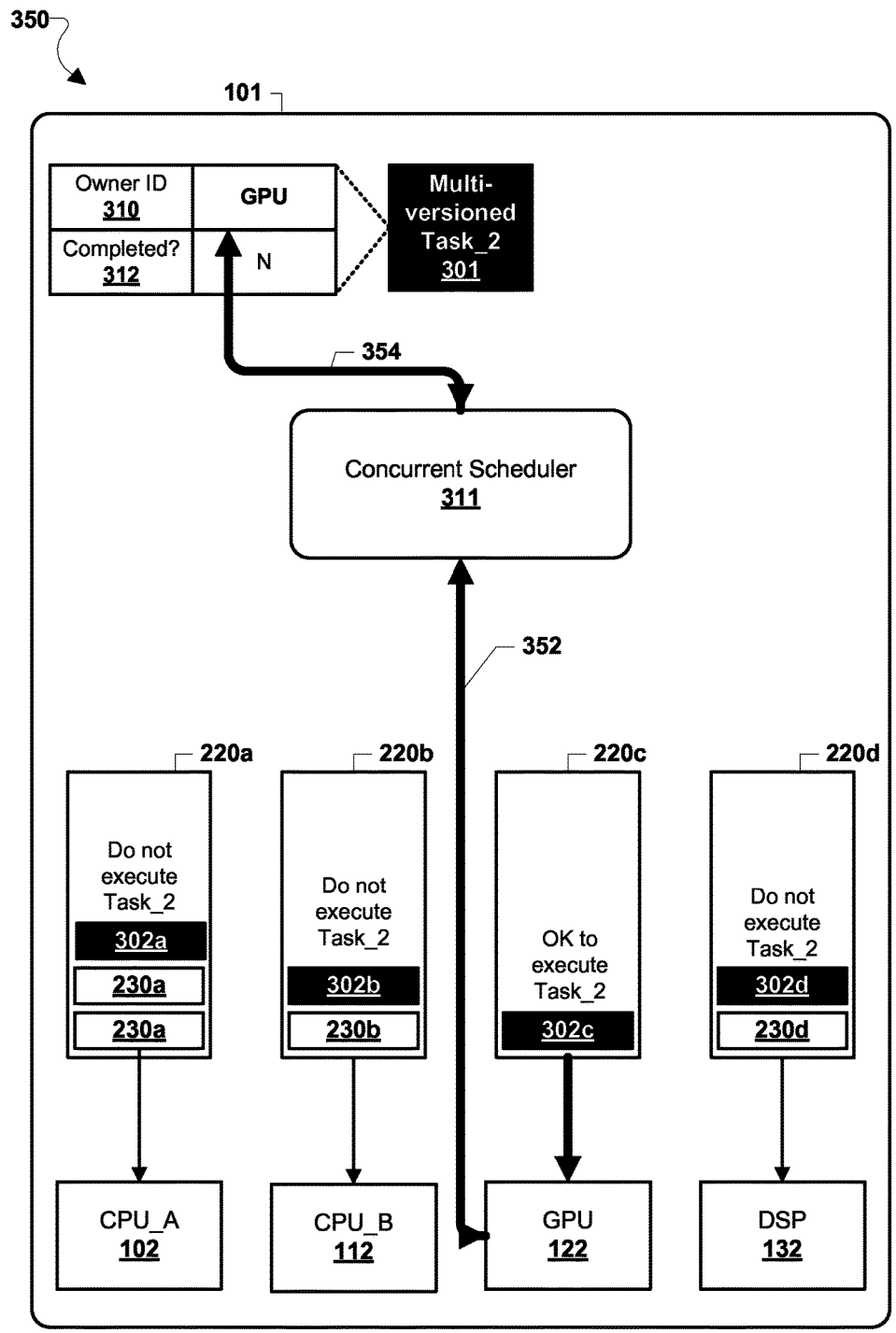
Figure 3C:
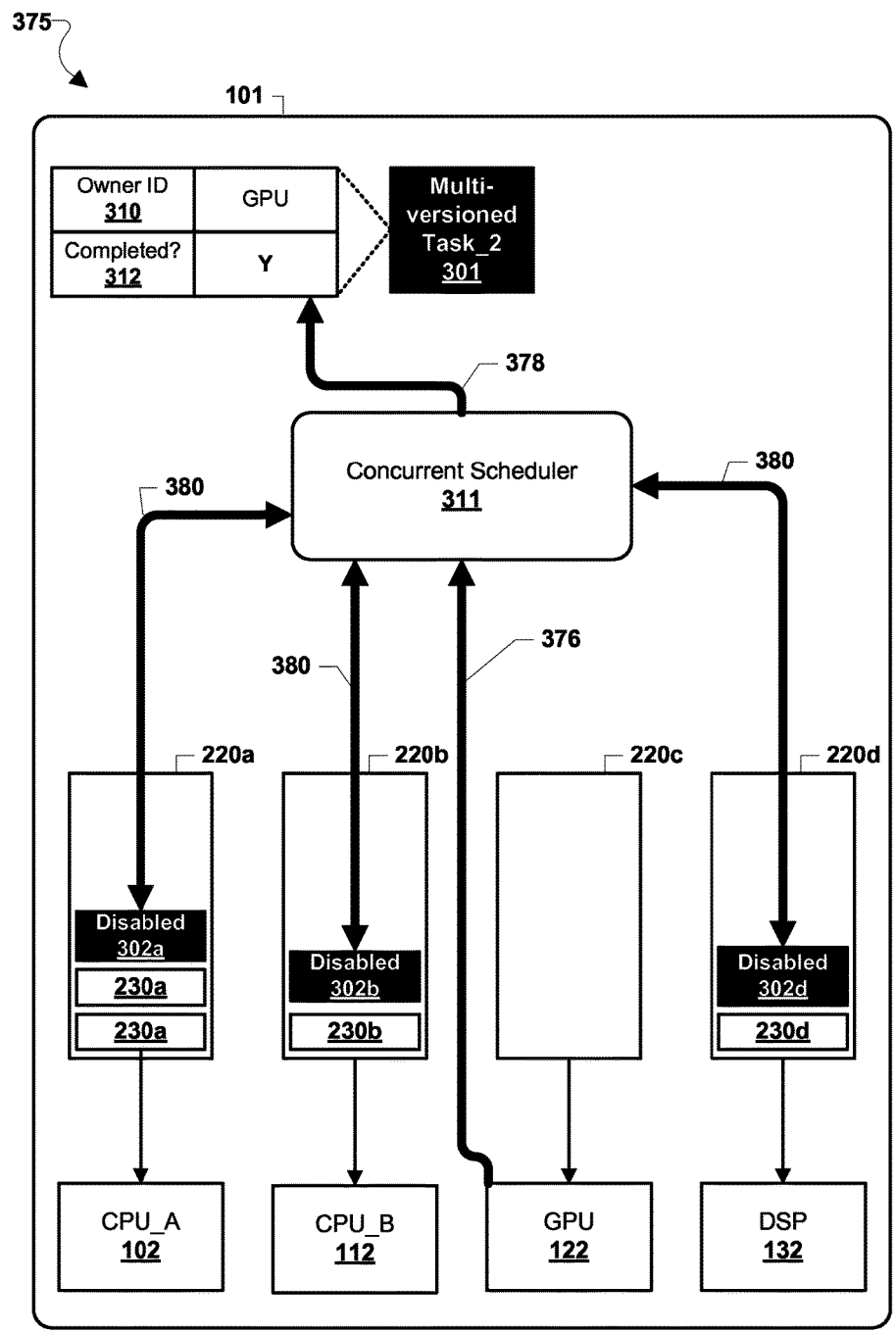

FIGS. 3A-3C illustrate an exemplary "late-binding" technique according to some embodiments that may be used to overcome the shortcomings of a priori scheduling policies for multi-versioned tasks, such as illustrated in FIGS. 2A-2B. In particular, embodiment late-binding operations may assign specialized versions of multi-versioned tasks based on relative speed of execution of processing units. This may ensure that, regardless of the relative load on the processing units of a multi-processor computing device at the time tasks are placed within task queues, the fastest processing unit to be ready to execute a specialized version may perform a multi-versioned task.

The components depicted in FIGS. 3A-3C are provided for illustrative purposes only and are not intended to limit the embodiments or claims to any particular structural implementation suitable for implementing methods according to various embodiments. For example, task queues 220a-220d may be represented in various data structures and/or other equivalent structures in multi-processor computing devices. As another example, a concurrent scheduler module 311 may represent one or more components, logic, devices, and/or other functionalities that may be supported by one or more processing units of a multi-processor computing device.

FIG. 3A includes a diagram 300 illustrating a multi-versioned task 301 that may be created for performing general-purpose operations (e.g., a calculation, etc.). The multi-versioned task 301 (referred to as "Task 2" in FIGS. 3A-3C) may include or otherwise be associated with a plurality of specialized versions 302a-302d of the multi-versioned task 301. For example, the multi-versioned task 301 may include a first specialized version 302a configured for execution on a first CPU 102, a second specialized version 302b configured for execution on a second CPU 112, a third specialized version 302c configured for execution on a GPU 122, and a fourth specialized version 302d configured for execution on a DSP 132.

In some embodiments, the multi-versioned task 301 may also be associated with stored data that may be used by the multi-processor computing device 101 to control how the processing units 102, 112, 122, 132 access or otherwise execute the multi-versioned task 301. For example, the multi-versioned task 301 may include or otherwise be associated with ownership data 310, such as a data field that stores an identifier (or ID) of a processing unit that has acquired the right to execute the multi-versioned task 301 (i.e., the ID of the processing unit having "ownership" over the multi-versioned task 301). In some embodiments, the ownership data 310 may not store an identifier but instead may simply store data indicating whether ownership over the multi-versioned task 301 has or has not been acquired by any processing unit (e.g., a single bit indicating owned/not-owned).

Prior to the multi-versioned task 301 being owned by a processing unit, the ownership data 310 may be null. The stored data associated with the multi-versioned task 301 may also include completion data 312, such as a data field that stores information indicating whether any specialized version 302a-302d of the multi-versioned task 301 has been completed. For example, as a default, the completion data 312 may be set to a negative value (e.g., 0, "N", "no", etc.), but after a processing unit having ownership over the multi-versioned task 301 executes one of the specialized versions 302a-302d, the completion data 312 may be set to a positive value to indicate the task is completed (e.g., 1, "Y", "yes", etc.). In some embodiments, the data fields 310-312 may be stored in a volatile or non-volatile memory, such as in a data array(s), system variable(s), register(s), and/or other structure(s) accessible to the multi-processor computing device 101.

At an arbitrary first time, a runtime functionality configured to schedule tasks (i.e., concurrent scheduler module 311) may determine that the multi-versioned task 301 has been created or is otherwise ready to be scheduled for execution. For example, the concurrent scheduler module 311 may be a scheduler functionality executed via a thread by an application processor that receives and dispatches new tasks. For simplicity, the concurrent scheduler module 311 is shown in FIGS. 3A-3C as a single module (e.g., software, component(s), instructions, routine(s), logic, etc.) that is configured to be executed via a thread (e.g., main thread 150). However, the concurrent scheduler module 311 may represent or otherwise be comprised of functionalities that may or may not be enabled by a single (or main) thread. For example, in some embodiments, the concurrent scheduler module 311 may be comprised of logic, components, routines, instructions, and/or other functionalities that are executed and enabled across multiple threads in the multi-processor computing device 101. In some embodiments, the concurrent scheduler module 311 may not necessarily be an execution entity that is separate from the various processing units of the multi-processor computing device 101 (e.g., GPU 122, DSP 132, etc.). For example, the concurrent scheduler module 311 may represent a logical functionality that may be executed inline by any processor or device (e.g., GPU 122, etc.) as part of operations to execute a multi-versioned task as described.

Regardless of the workloads of the processing units 102, 112, 122, 132 at the first time (e.g., the other tasks 230a-

230d), the concurrent scheduler module 311 may concurrently assign each of the specialized versions 302a-302d to the task queues 220a-220d of the processing units 102, 112, 122, 132. For example, the concurrent scheduler module 311 may send the first specialized version 302a that is configured for execution by a CPU to the first task queue 220a associated with the first CPU 102, the second specialized version 302b that is configured for execution by a CPU to the second task queue 220b associated with the second CPU 112, the third specialized version 302c that is configured for execution by a GPU to the third task queue 220c associated with the GPU 122, and the fourth specialized version 302d that is configured for execution by a DSP to the fourth task queue 220d associated with the DSP 132. In some embodiments, sending the specialized versions 302a-302d may include placing task pointers or other data representations of the specialized versions 302a-302d within the appropriate task queues 220a-220d.

FIG. 3B includes a diagram 350 illustrating a processing unit (i.e., GPU 122) acquiring ownership over the multi-versioned task 301. For example, after the first time illustrated in FIG. 3A, the GPU 122 may complete all other tasks 230c in the third task queue 220c and therefore become available to execute the third specialized version 302c of the multi-versioned task 301. The GPU 122 may exchange signals 352 with the concurrent scheduler module 311 (i.e., runtime functionality) to acquire the ownership over the multi-versioned task 301. For example, upon determining that the next task to execute in the third task queue 220c is the third specialized version 302c, the GPU 122 may transmit a request signal to the concurrent scheduler module 311, and in response the concurrent scheduler module 311 may transmit a response signal that indicates whether the GPU 122 acquired the ownership. In some embodiments, the signals 352 may include an API call from the GPU 122 for configuring the multi-versioned task 301 to be configured to finish in response to the GPU 122 finishing a specialized version of the multi-versioned task 301. For example, the signals 352 from the GPU 122 may include a "finish_after( )" call that causes the concurrent scheduler module 311 to configure the multi-versioned task 301 to complete, cancel, or otherwise end all associated versions of the multi-versioned task 301 (e.g., 302a, 302b, 302d) in response to determining that the third specialized version 302c has completed. In other words, the "finish_after( )" may be a mechanism that causes a multi-versioned task to finish after the execution of only one specialized version of the multi-versioned task.

In some embodiments, the concurrent scheduler module 311 may perform operations 354 to check and/or update the ownership data 310 associated with the multi-versioned task 301 in response to receiving signaling 352 from the GPU 122. For example, the concurrent scheduler module 311 may query the ownership data 310 to determine whether a processing unit identifier is already set and if not may cause the identifier of the GPU 122 (e.g., "GPU") to be stored in the ownership data 310.

Once the GPU 122 acquires ownership over the multi-versioned task 301 (i.e., GPU 122 has the exclusive right to execute a specialized version of the multi-versioned task 301), the other processing units 102, 112, 132 may eventually complete other tasks and become available to execute specialized versions 302a, 302b, 302d. However, in response to exchanges with the concurrent scheduler module 311, these other processing units 102, 112, 132 may be denied ownership over the multi-versioned task 301 and thus may be precluded from executing the corresponding specialized versions 302a, 302b, 302d. Instead, the other processing units 102, 112, 132 may be configured to simply discard the specialized versions 302a, 302b, 302d without execution due to such ownership denials. For example, the specialized versions 302a, 302b, 302d may be discarded in response to the GPU 122 acquiring ownership over the multi-versioned task 301. In some cases, the GPU 122 may have already completed execution of the third specialized version 302c by the time the other processing units 102, 112, 132 are ready to execute corresponding specialized versions 302a, 302b, 302d, and so the other processing units 102, 112, 132 may dequeue and discard specialized versions 302a, 302b, 302d and simply begin executing other tasks entered into corresponding task queues 220a, 220b, 220d.

FIG. 3C includes a diagram 375 illustrating signaling occurring after the GPU 122 completes execution of the third specialized version 302c, thus completing the multi-versioned task 301. In some embodiments, the GPU 122 may transmit a signal 376 to the concurrent scheduler module 311 indicating completion of the third specialized version 302c, and in turn, the concurrent scheduler module 311 may perform operations 378 to update the data 312 (e.g., store a "Y" value). In some embodiments, the concurrent scheduler module 311 may exchange signals 380 with the other processing units 102, 112, 132 that cause the other processing units 102, 112, 132 to dequeue or disable corresponding specialized versions 302a, 302b, 302d of the multi-versioned task 301 and resume execution of other tasks in corresponding task queues 220a, 220b, 220d. For example, when ready to execute specialized versions 302a, 302b, 302d, the other processing units 102, 112, 132 may request ownership. In response, the signals 380 may indicate that ownership of the multi-versioned task 301 is unavailable, and thus the processing units 102, 112, 132 may disable the specialized versions 302a, 302b, 302d and proceed with other tasks unrelated to the multi-versioned task 301.

In some embodiments, the operations 378 may include dequeuing and/or otherwise deleting the multi-versioned task 301, such as by removing data associated with the multi-versioned task 301 from memory. In some embodiments, the GPU may not be required to transmit the signal 376 as the original signals 352 to acquire the ownership over the multi-versioned task 301 may be adequate for disabling other processing units 102, 112, 132 from executing respective specialized versions 302a, 302b, 302d. For example, after the signals 352 are sent, the DSP 132 may dequeue the fourth specialized version 302d, determine that the associated multi-versioned task 301 is already owned by the GPU 122 (e.g., via signaling to the concurrent scheduler module 311), and thus simply discard the fourth specialized version 302d.

Figure 4A:
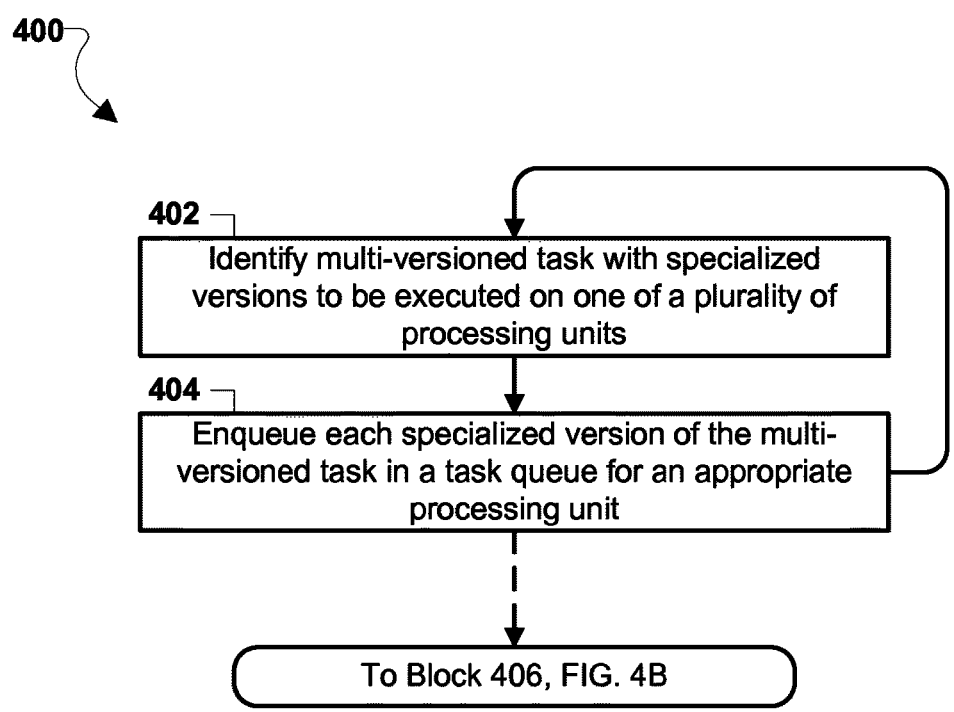
FIG. 4A is a process flow diagram illustrating an embodiment method performed by a multi-processor computing device to schedule specialized versions of multi-versioned tasks.

FIG. 4A illustrates a method 400 performed by a multi-processor computing device to schedule and dispatch specialized versions of multi-versioned tasks to various processing unit task queues. As described, the multi-processor computing device (e.g., multi-processor computing device 101 in FIGS. 1-3C) may be configured to perform late-binding of multi-versioned tasks at runtime by concurrently assigning specialized versions to a plurality of processing units, for instance, some or all processing units supported for the multi-versioned tasks. The method 400 may be performed by the multi-processor computing device to place specialized versions in appropriate task queues of various processing units. In some embodiments, various operations of the method 400 may be performed by a runtime functionality (e.g., concurrent scheduler module 311 of FIGS. 3A-3C) executing via a processing unit of a multi-processor computing device, such as the CPU 102, GPU 122, or DSP 132 of the multi-processor computing device 101 of FIGS. 1-3C.

Figure 5A:
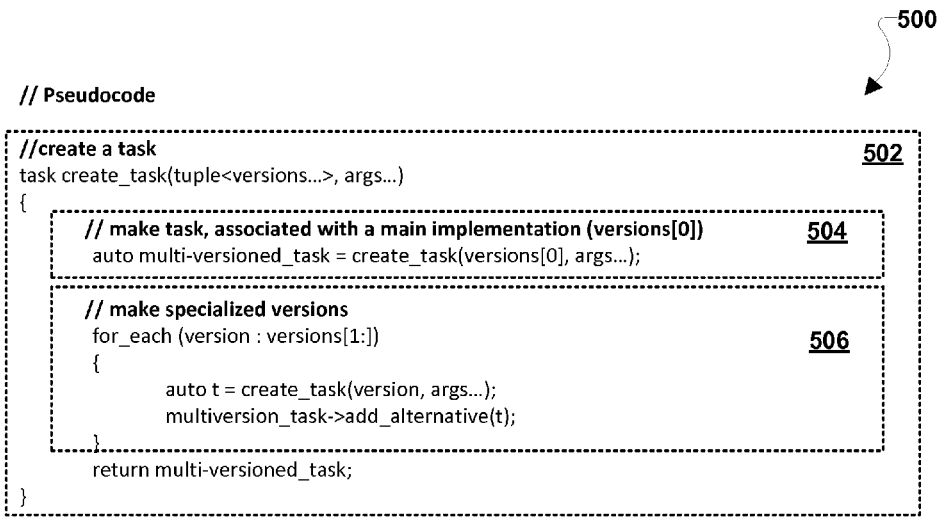

The multi-processor computing device may identify a multi-versioned task with specialized versions to be executed on one of a plurality of processing units in block 402. Each specialized version may be configured to be executed by a different processing unit of the plurality of processing units (e.g., GPU, CPU, DSP, etc.). The identification may include determining whether a task to be scheduled by the multi-processor computing device is associated with specialized versions (or alternative tasks/identifiers). For example, the multi-processor computing device may perform an operation (e.g., the "has_alternatives( )" function call in FIG. 5B) to determine whether a new task to be scheduled has alternative numbers that indicate specialized versions. In some embodiments, the multi-processor computing device may make such identifications in response to the creation of the multi-versioned task by a processing unit. For example, the multi-processor computing device may identify any new task created via an API call that indicates supported specialized versions as a multi-versioned task. An exemplary code for creating a multi-versioned task is illustrated in FIG. 5A.

When launched for execution, a multi-versioned task may be considered for scheduling by the multi-processor computing device, such as at a time when the multi-versioned task has no predecessor dependencies and/or at a time defined by various scheduling optimizations. In some embodiments, the multi-versioned task may be scheduled based on a scheduling policy that evaluates task graphs by various properties (e.g., processing unit type, etc.) to find subgraphs. For example, the multi-versioned task may identify within a large task graph a subgraph of all tasks for a GPU, and dispatch the entire subgraph at once for execution on the GPU. Such a dispatch may include a single GPU-to-CPU callback to indicate finish of all the tasks in the subgraph, reducing the number of round-trips between the CPU and GPU for scheduling purposes.

In block 404, the multi-processor computing device may enqueue each of the specialized versions of the multi-versioned task in a task queue for an appropriate processing unit of the plurality of processing units. For example, if there are specialized versions available for a CPU, a GPU, and a DSP, the multi-processor computing device may enqueue a CPU specialized version in the task queue of the CPU, a GPU specialized version in the GPU task queue, and a DSP specialized version in the DSP task queue. The multi-processor computing device may only enqueue specialized versions in task queues of processing units that are supported by the multi-versioned task. For example, the multi-processor computing device may only enqueue specialized versions in the GPU's task queue and the CPU's task queue and may ignore unsupported processing units (e.g., a DSP, etc.) if only CPU and GPU specialized versions of the multi-versioned task are provided by a programmer.

The multi-processor computing device may continue with the operations in block 402. In some embodiments, the multi-processor computing device may continue with the operations of block 404 in FIG. 4B.

In some embodiments, the multi-processor computing device may enqueue a task pointer (or other similar data) for each specialized version in each appropriate task queue. An exemplary enqueing of pointers for various specialized versions of a multi-versioned task is illustrated in FIG. 5B (e.g., code subsection 526 and code section 528). In some embodiments, the multi-processor computing device may encode task identification information into the pointers. In particular, the pointers may each include data indicating the multi-versioned task as well as an individual specialized version. Such task information within the pointers may be accessed by the individual processing units by applying different bit masks. For example, a first processing unit (e.g., a GPU) may identify a multi-versioned task by applying a parent mask to the pointer dequeued from an associated task queue and may identify a specialized version by applying a second mask (or an alternative mask) to the same pointer. In some embodiments, data indicating the specialized version may be included within the lowest 4 bits of each pointer. An exemplary encoding of pointers is illustrated in FIG. 5B (e.g., code subsection 526) and an application of such masks by a processing unit to retrieve task identification information is illustrated in FIG. 7 (e.g., code section 702).

Figure 4B:
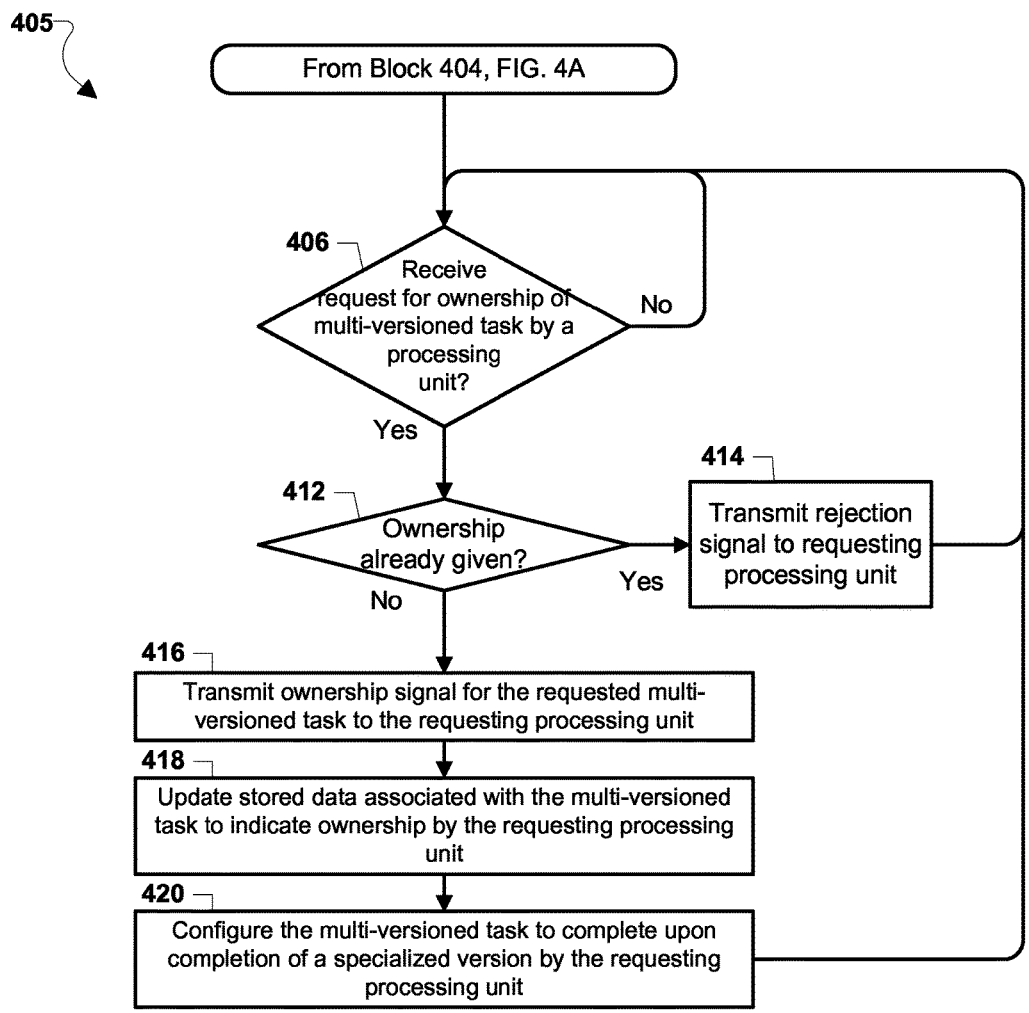
FIG. 4B is a process flow diagram illustrating an embodiment method performed by a multi-processor computing device to manage the performance of multi-versioned tasks.

FIG. 4B illustrates a method 405 performed by a multi-processor computing device (e.g., multi-processor computing device 101 in FIGS. 1-3C) to manage the performance of multi-versioned tasks. As described, once specialized versions of a multi-versioned task are assigned to all supported processing units, the first of the supported processing units to become ready to immediately execute a specialized version enqueued within an associated task queue may gain ownership over the multi-versioned task. Such ownership acquisition may prevent the other supported processing units from executing corresponding specialized versions of the same multi-versioned task. For example, specialized versions in task queues of processing units that fail to get ownership may simply finish without execution, such as in response to determining the first processing unit has already acquired ownership and completed a corresponding specialized version. Acquiring ownership over multi-versioned tasks may ensure that each multi-versioned task is executed by the fastest single processing unit that is ready to execute an appropriate specialized version, thereby providing better performance than potentially inaccurate a priori prediction schemes.

In some embodiments, the method 405 may be performed for each multi-versioned task active within the multi-processor computing device. For example, the multi-processor computing device may concurrently execute one or more instances of the method 405 (e.g., one or more threads for executing method 405) to handle the management of one or more multi-versioned tasks. In some embodiments, various operations of the method 405 may be performed by a runtime functionality (e.g., concurrent scheduler module 311 of FIGS. 3A-3C) executing via a processing unit of a multi-processor computing device, such as the CPU 102, GPU 122, or DSP 132 of the multi-processor computing device 101 of FIGS. 1-3C. In various embodiments, the method 405 may be performed in combination with the method 400 described with reference to FIG. 4A. For example, a runtime functionality may be configured to perform both methods 400, 405 in order to identify, dispatch, and then manage multi-versioned tasks across a plurality of processing units according to various embodiments.

Some time after specialized versions of a multi-versioned task are distributed to task queues of a plurality of processing units (e.g., after execution of block 404 of the method 400), the multi-processor computing device may determine whether a request for ownership of the multi-versioned task was received from a requesting processing unit in determination block 406. Such a request may be sent via an inter-processor signal, interrupt, register, and/or other data that may be shared between processing units of the computing device. For example, a GPU may use an API call to request ownership over the multi-versioned task associated with a specialized version within the GPU's task queue. An exemplary request call or function by a processing unit is illustrated in FIG. 7 (e.g., "t->request_ownership( )" in code section 706).

In response to determining that a request for ownership of the multi-versioned task was received from the requesting processing unit in (i.e., determination block 406="Yes"), the multi-processor computing device may determine whether the ownership of the multi-versioned task was already given to another processing unit in determination block 412. For example, the multi-processor computing device may evaluate stored data associated with the multi-versioned task to determine whether an "ownership" variable, flag, and/or other indicator has been set indicating that a processing unit has previously acquired ownership over that particular multi-versioned task.

In response to determining that the ownership has already been given to another processing unit (i.e., determination block 412="Yes"), the multi-processor computing device may transmit a rejection signal to the requesting processing unit that transmitted the request for ownership over the multi-versioned task in block 414. Such a rejection signal may cause the requesting processing unit to discard a dequeued specialized version of the multi-versioned task. In some embodiments, the operations of block 414 may be optional as the multi-processor computing device may simply fail to respond to requests for ownership in order to indicate that processing units are not provided ownership.

In response to determining that the ownership has not already been given to a processing unit (i.e., determination block 412="No"), the requesting processing unit may be the first to access a corresponding specialized version of the multi-versioned task, and so may be identified as the owner. Therefore, in block 416, the multi-processor computing device may transmit an ownership signal for the requested multi-versioned task to the requesting processing unit, such as by transmitting an acknowledgement.

In block 418, the multi-processor computing device may update stored data associated with the multi-versioned task to indicate ownership by the requesting processing unit, such as by storing data representing the identity of the requesting processing unit within a data structure, variable, and/or register that is associated with the multi-versioned task. In some embodiments, the multi-processor computing device may store data for the multi-versioned task that simply indicates the multi-versioned task is currently owned by a processing unit.

In block 420, the multi-processor computing device may configure the multi-versioned task to terminate or otherwise complete upon the subsequent completion of the requesting processing unit's execution of a corresponding specialized version. For example, at some later time when the requesting processing unit completes execution of a corresponding specialized version, the multi-processor computing device may mark the multi-versioned task as completed. In other words, the multi-processor computing device may set the multi-versioned task as "owned" and all associated specialized versions to be discarded (e.g. not executed) in response to a single specialized version being executed by a single processing unit.

In response to performing the operations of block 420, the multi-processor computing device may continue with the determination operations in determination block 406, such as for identifying subsequently received signals indicating completion of a specialized version and/or requesting ownership.

In some embodiments, the configuration may include a call to an API command "finish_after( )" that causes the multi-versioned task to experience a delayed finish. For example, in response to obtaining the ownership over the multi-versioned task, the requesting processing unit and/or another processing unit or functionality of the multi-processor computing device may execute the "finish_after( )" command in order to set the lifetime of the multi-versioned task to be connected to the lifetime of the specialized version to be executed by the requesting processing unit that acquired ownership. Any task dependencies, waits, etc. on the multi-versioned task may be automatically fulfilled by the specialized version's execution. An exemplary use of such a "finish_after( )" command is illustrated in FIG. 7 (e.g., code subsection 708). Techniques for implementing such a "finish_after( )" command may be found in commonly-held U.S. patent application Ser. No. 14/604,821, filed Jan. 26, 2015, the contents of which are herein incorporated by reference in their entirety.

In response to determining that a request for ownership of the multi-versioned task was not received from a processing unit in (i.e., determination block 406="No"), the multi-processor computing device may continue listening for subsequent requests for ownership of the multi-versioned task in determination block 402.

In some embodiments, the multi-processor computing device may be configured to periodically determine whether a specialized version of the multi-versioned task has completed after a processing unit has acquired ownership over the multi-versioned task. Such a determination may be based on signals received from a processing unit having ownership over the multi-versioned task, based on evaluations of a bit, variable, register, or other data that may be updated by a processing unit having ownership over the multi-versioned task, and/or based on the expiration of a predefined period of time. For example, the multi-processor computing device may listen for incoming signals from a GPU that already acquired ownership over the multi-versioned task that indicate the GPU has completed execution of a respective specialized version, thus indicating the multi-versioned task may finish as well. In this way, in various embodiments the multi-processor computing device may be configured to use periodic polling and/or event-driven mechanisms for detecting (or being notified of) the completion of a specialized version of a multi-versioned task.

In some embodiments, in response to determining that a specialized version of the multi-versioned task has completed, the multi-processor computing device may perform operations for finishing the multi-versioned task. For example, the multi-processor computing device may terminate (e.g., dequeue, invalidate, etc.) the multi-versioned task.

In some embodiments, the multi-processor computing device may also perform operations to finish related specialized versions of the finished multi-versioned task in response to an identified (e.g., detected or notified) completion of a specialized version of the multi-versioned task. For example, in response to determining that the GPU completed a GPU specialized version, the specialized versions for the CPU and DSP may be set to complete or end without execution. Other examples of operations that may be performed by the multi-processor computing device to finish related specialized versions of a multi-versioned task (e.g., those specialized versions that are not executed) may include causing the specialized versions to leave task groups and/or releasing memory allocated to the related un-executed specialized versions. In some embodiments, the multi-processor computing device may transmit signals or interrupts, set registers, and/or perform other operations to actively indicate to various processing units that no other specialized versions of the multi-versioned task should be executed, thereby nullifying any unexecuted but still enqueued specialized versions. The method 405 may then end as the multi-versioned task has been processed via the execution of only one specialized version.

FIGS. 5A-5B illustrate non-limiting exemplary pseudocode 500, 520 representing instructions that may be performed by a multi-processor computing device (e.g., computing device 101) to create and dispatch specialized versions of multi-versioned tasks to task queues according to various embodiments. In some embodiments, the pseudocode 500, 520 may represent operations performed by a runtime scheduler functionality (e.g., a service, thread, application, etc.) executing on the multi-processor computing device. In some embodiments, the pseudocode 500 may be used for various main implementations (e.g., versions [0], . . . versions[n]), and thus is not intended to limit the embodiments and/or claims.

Referring to FIG. 5A, the pseudocode 500 represents a non-limiting example of instructions that may be executed by a processing unit (e.g., a CPU 102, applications processor, etc.) in order to create new multi-versioned tasks having one or more specialized versions that are each designed to be performed on particular processing units of the multi-processor computing device. In particular, the pseudocode 500 may represent a function (i.e., the "create_task" function) that may be called with various arguments, including a tuple indicating the specialized versions that are supported for the multi-versioned task to be created. For example, the tuple may indicate GPU, DSP, and CPU specialized versions should be created. In some embodiments, the order in which the specialized versions are indicated in the tuple argument for the function may indicate relative preference or priority.

The pseudocode 500 may include a first code section 502 including a recursive function that may itself be called by instructions within the first code section 502. For example, a first code subsection 504 may be included that creates a task using the 'create_task' function. The first time that the first code subsection 504 is executed regarding a particular task, a "main" multi-versioned task may be created. A second code subsection 506 (e.g., a 'for' loop) may be performed to create specialized versions (or "alternatives") that may be linked (or referenced by) for the main multi-versioned task. For example, pointer data for each specialized version (or "alternative") may be stored in association with the main multi-versioned task.

In some embodiments, task creation may be initiated or otherwise executed based on a programmer (e.g., inserting function calls or API calls within code to create tasks, etc.) and/or a compiler or runtime system.

Referring to FIG. 5B, the pseudocode 520 represents a non-limiting example of instructions of one or more methods, functions, routines, or other logic that are periodically executed by a processing unit (e.g., a CPU 102, applications processor, etc.) in order to schedule (or dispatch) various tasks, multi-versioned or otherwise, to task queues of processing units of the device (e.g., CPU 102, CPU 112, GPU 122, DSP 132, etc.). Any references to particular processing units within the pseudocode 520 (e.g., big.Little core, GPU, etc.) are for illustration purposes and thus are not intended to limit the embodiments or claims to any particular processing units.

The pseudocode 520 may include a first code section 522 for scheduling a task. The first code section 522 may include a first code subsection 524 (e.g., an 'if' block) that may be performed in response to determining that the task has no alternatives (i.e., the task is not a multi-versioned task), wherein the task is simply enqueued in a task queue of a processing unit.

A second code subsection 526 (e.g., an 'else' block) may be performed in response to determining that the identified task has alternatives (i.e., the task is a multi-versioned task), and may include operations for enqueuing pointers for each of the specialized versions (or "alternatives") of the multi-versioned task in one of the task queues of the various processing units of the computing device. Such pointers may have identifiers encoded in unused bits, such as the lowest 4 bits of a pointer. For example, second code subsection 526 may be performed to push N task pointers to the appropriate task queues, where N may be the number of specialized versions (or implementations) of a given multi-versioned task, with the individual alternative numbers encoded in each task pointer. A second code section 528 may include operations for enqueuing tasks into appropriate task queues of processing units based on an identifier generated by applying a mask (or bit mask) to a task pointer. Various "push(task)" operations in the code section 528 may be performed that retain alternative encodings for tasks until the tasks are dequeued.

Figure 6:
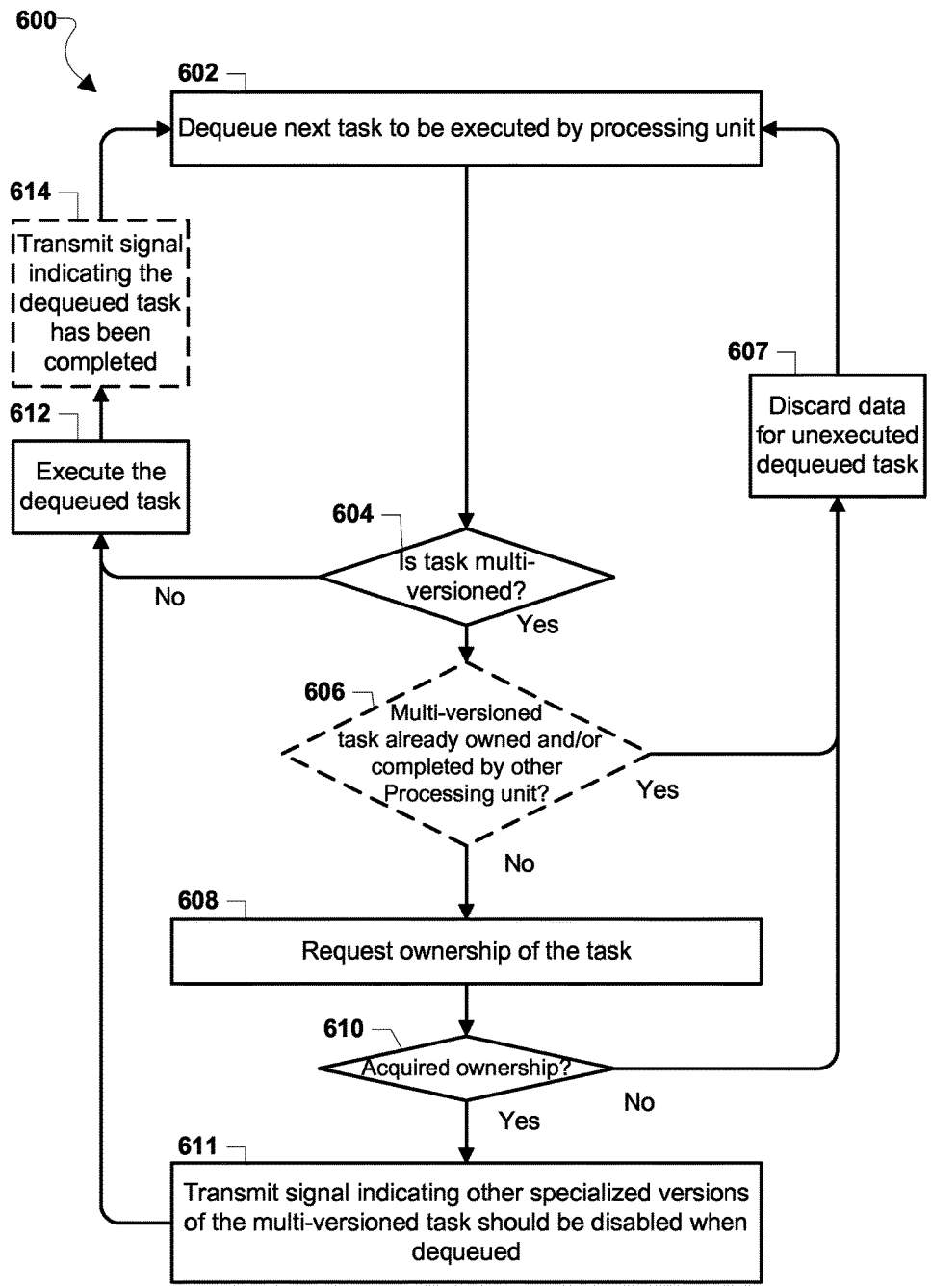
FIG. 6 is a process flow diagram illustrating an embodiment method performed by a multi-processor computing device to execute specialized versions of multi-versioned tasks according to various embodiments.

FIG. 6 illustrates a method 600 performed by a processing unit (e.g., any of processing units 102, 112, 122, 132 of FIGS. 1-3C) of a multi-processor computing device (e.g., multi-processor computing device 101 of FIGS. 1-3C) to execute specialized versions of multi-versioned tasks according to various embodiments. In various embodiments, each of the processing units of the multi-processor computing device may be configured to continually execute the method 600 in order to handle specialized versions of multi-versioned tasks as described herein. For example, a first CPU (e.g., processing unit 102 of FIGS. 1-3C), a second CPU (e.g., processing unit 112 of FIGS. 1-3C), a GPU (e.g., processing unit 122 of FIGS. 1-3C), and a DSP (e.g., processing unit 132 of FIGS. 1-3C) may all be configured to independently and concurrently execute independent instances of the method 600 in order to acquire ownership over multi-versioned tasks and execute related specialized versions. Various operations of the method 600 may be performed via various software, threads, routines, instructions and/or other functionalities configured to control and otherwise operate the processing unit. For example, a thread (e.g., a DSP thread in a thread pool associated with a task queue) may perform the method 600 to dequeue task pointers from the task queue and perform operations to acquire ownership of multi-versioned tasks when appropriate.

In block 602, the processing unit may dequeue a next task to be executed by the processing unit. In some embodiments, dequeuing the next task may include removing a pointer from the task queue. In determination block 604, the processing unit may determine whether the dequeued task is a specialized version of a multi-versioned task. For example, the processing unit may apply various bit masks to a pointer to obtain an identifier, and may determine whether the identifier corresponds to any specialized versions (or "alternative" numbers) of the multi-versioned task. Exemplary operations for performing the determination are illustrated in FIG. 7 (e.g., code section 702, command "t->has_alternatives" in code section 704).

In some embodiments, the processing unit may perform a look-up within a table or other storage structure to compare an identifier of the dequeued task with stored data that indicates whether the dequeued task is a multi-versioned task or merely a typical task having only one version. Such implementations may not require bit masks to be applied to individual pointers placed within task queues in order to identify specialized versions. The following is an illustration of such an implementation. The processing unit may retrieve (or dequeue) a pointer from the task queue of the first processing unit, wherein the pointer may be a common multi-versioned task pointer placed in the task queue for each processing unit that has a supported specialized version for the multi-versioned task. Once retrieved, the processing unit may determine whether the pointer is associated with a list of specialized versions of the multi-versioned task (i.e., determine whether there are alternatives associated with the pointer). If there is a list of specialized versions associated with the pointer, the multi-processor computing device may then identify a specialized version of the multi-versioned task from the list of specialized versions that corresponds to the processing unit. For example, if the processing unit is a GPU, the processing unit may identify a GPU specialized version is in the list. If a corresponding specialized version is identified in the list, the processing unit may then proceed to obtain ownership over the multi-versioned task and execute the corresponding specialized version.

In response to determining that the dequeued task is not a specialized version of a multi-versioned task (i.e., determination block 604="No"), the processing unit may execute the dequeued task in block 612. In some embodiments, the processing unit may be configured to transmit a signal indicating the completion of the dequeued task in optional block 614. In some embodiments, the completion of the dequeued task may instead be indicated by setting a variable, flag, bit, or other stored data to indicate to the multi-processor computing device (and/or the various processing units) that the dequeued task has been completely executed.

In response to determining that the dequeued task is a specialized version of a multi-versioned task (i.e., determination block 604="Yes"), the processing unit may determine whether the multi-versioned task is already owned and/or has been completed (and thus the entire multi-versioned task has been completed) by another processing unit in optional determination block 606. In other words, the processing unit may determine whether the specialized version from the corresponding task queue is still valid and should be executed by the processing unit if ownership can be acquired. If ownership of the multi-versioned task cannot be acquired by the processing unit, the multi-versioned task has been completed or is being completed by another processing unit, and thus the processing unit may simply discard the task and continue to process other tasks. The processing unit may determine whether multi-versioned task has been completed in various manners, such as by evaluating a bit, variable, register, and/or other stored information indicating the status of the multi-versioned task, transmitting an update request to a runtime functionality, and/or evaluating whether information stored in association with the dequeued specialized version indicates a completed status.

In response to determining that the multi-versioned task is already owned and/or has been completed (i.e., optional determination block 606="Yes"), the processing unit may discard data for the unexecuted, dequeued task (representing the specialized version assigned to the processing unit) in block 607 and return to the dequeuing operations in block 602.

In response to determining that no other specialized version of the multi-versioned task has been completed by another processing unit (i.e., optional determination block 606="No"), the multi-versioned task is not yet owned, and thus the processing unit may still be able to execute a corresponding specialized version. Thus, in block 608, the processing unit may request ownership of the multi-versioned task, such as by transmitting a request signal to a runtime functionality configured to schedule and/or manage multi-versioned tasks. An exemplary call for requesting ownership is illustrated in FIG. 7 (e.g., code section 706).

In determination block 610, the processing unit may determine whether ownership of the multi-versioned task has been acquired by the processing unit. For example, the processing unit may continually monitor an incoming message buffer and/or a stored bit, variable, register, and/or other information in order to determine whether a response from a runtime functionality configured to schedule and manage multi-versioned tasks has provided ownership of the multi-versioned task to the processing unit.

In response to determining that the ownership has not been acquired by the processing unit (i.e., determination block 610="No"), the multi-versioned task (and thus the specialized version assigned to but not executed by the processing unit) may be considered owned by another processing unit, and thus the processor may discard data for the unexecuted, dequeued task in block 607. For example, the processing unit may discard a task pointer for a specialized version of the multi-versioned task. The processing unit may then continue with the dequeuing operations in block 602.

In response to determining that the ownership has been acquired by the processing unit (i.e., determination block 610="Yes"), the processing unit may transmit a signal indicating other specialized versions of the multi-versioned task should be disabled when dequeued in block 611. For example, as there is no need to wait until the completion of the processing unit's specialized version to disable the other specialized versions, the signal may cause other processing units to disable enqueued other specialized versions and/or discard dequeued task pointer data for the other specialized versions of the multi-versioned task.

In some embodiments, the processing unit may execute a call to an API command "finish_after( )" that causes the multi-versioned task to experience a delayed finish (e.g., the multi-versioned task may not complete until the processing unit fully executes the dequeued task). For example, the processing unit may execute the "finish_after( )" command in order to set the lifetime of the multi-versioned task to be connected to the lifetime of the dequeued task and thus cause a runtime functionality to finish the multi-versioned task (and all other specialized versions associated with the multi-versioned task). An exemplary use of such a "finish_after( )" command is illustrated in FIG. 7 (e.g., code subsection 708).

The processing unit may continue by executing the dequeued task (i.e., the specialized version of the multi-versioned task) in block 612, transmitting a signal indicating the dequeued task has been completed in optional block 614, and continue with the dequeuing operations in block 602.

FIG. 7 illustrates exemplary pseudocode 700 representing instructions that may be performed by a processing unit of a multi-processor computing device (e.g., multi-processor computing device 101 of FIGS. 1-3C) to execute specialized versions of multi-versioned tasks according to various embodiments. For example, the pseudocode 700 may represent the instructions of one or more methods, functions, routines, or other logic that are periodically executed by a processing unit (e.g., CPU 102, CPU 112, GPU 122, DSP 132, etc.) in order to process various tasks, multi-versioned or otherwise.

As a non-limiting illustration, the pseudocode 700 may include a first code section 702 for dequeuing pointers from a task queue of the processing unit, wherein masks (e.g., bit masks) may be applied to the pointers to identify a task (e.g., a multi-versioned task identity) and any other identification for the task (e.g., alternative number or version numbers for multi-versioned tasks). A second code section 704 (e.g., an 'if' block) may be performed in response to determining that the identified task has no alternatives (i.e., the task is not a multi-versioned task). A third code section 706 (e.g., an 'else' block) may be performed in response to determining that the identified task has alternatives (i.e., the task is a multi-versioned task), and may include operations for requesting/acquiring ownership over the multi-versioned task. The third code section 706 may include a first code subsection 708 (e.g., an 'if' block) that may be performed by the processing unit in response to determining that ownership of the multi-versioned task has been acquired by the processing unit. The first code subsection 708 may include operations for configuring the multi-versioned task to end (or conclude) at the completion of a version as well as operations for executing the version. The third code section 706 may also include a second code subsection 710 (e.g., an 'else' block) that may be empty and otherwise not include operations to be performed by the processing unit in response to determining that ownership of the multi-versioned task has not been acquired by the processing unit. For example, when ownership cannot be acquired for a specialized version of a multi-versioned task, the processing unit may not perform a specialized version, but instead discard data for the specialized version and proceed to process other tasks in a task queue.

Figure 8:
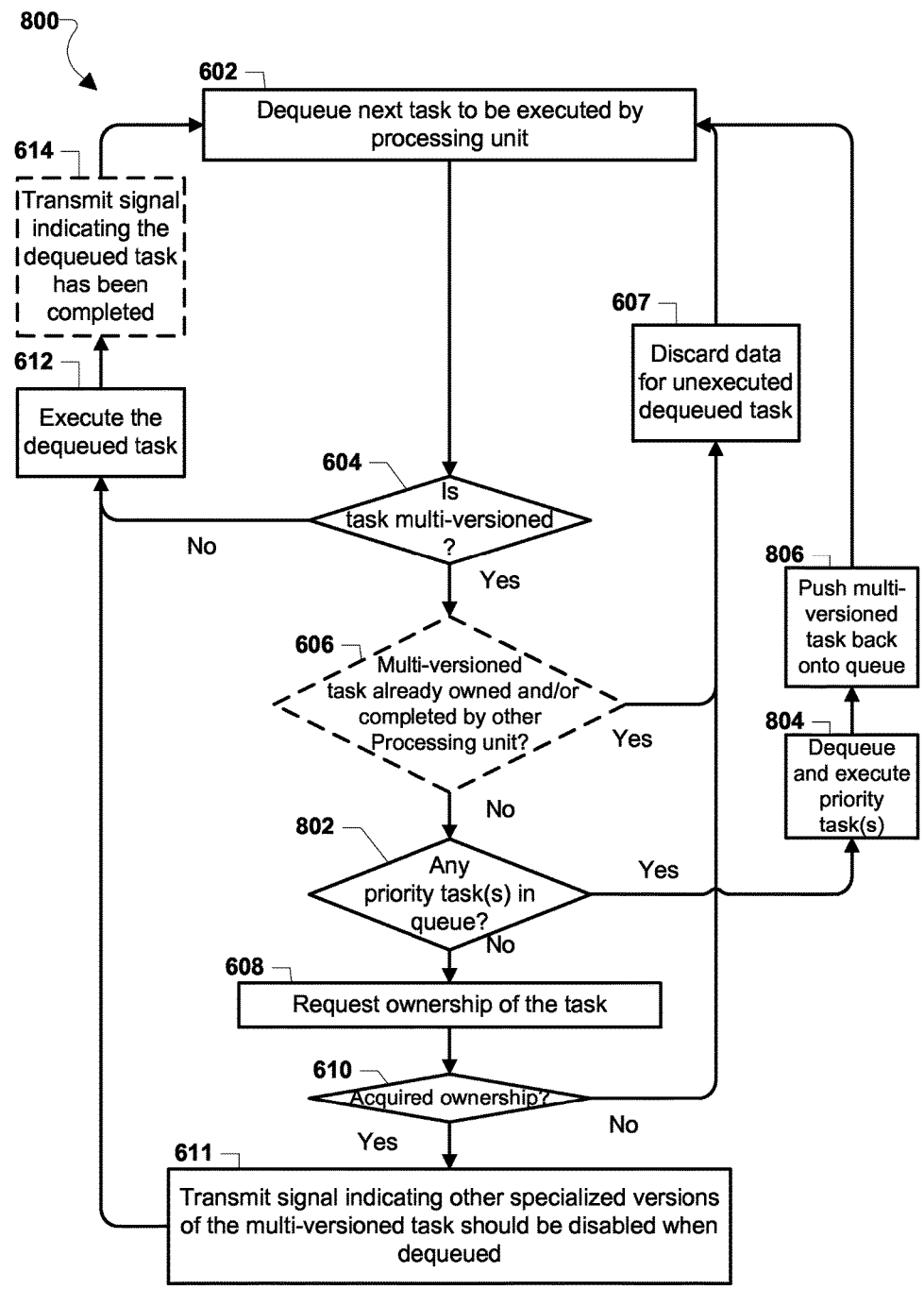
FIG. 8 is a process flow diagram illustrating an embodiment method performed by a multi-processor computing device to execute priority tasks and specialized versions of multi-versioned tasks.

FIG. 8 illustrates a method 800 performed by a processing unit of a multi-processor computing device to execute priority tasks and specialized versions of multi-versioned tasks. The method 800 may be similar to the method 600 of FIG. 6, except that the method 800 may include additional operations for identifying and processing priority tasks. As described, such priority tasks may be uniquely suited for the processing unit, and thus should be executed by the processing unit prior to expending resources participating in parallel processing of multi-versioned tasks. For example, instead of performing a GPU version of a common multi-versioned task having other versions that can alternatively be executed at a DSP or CPU, a GPU processing unit may execute a rendering task before performing operations to acquire ownership over the multi-versioned task and executing the GPU version. In this manner, the processing unit may participate in parallel-processing policies without undermining native activities of the processing unit.

The operations of blocks 602-614 may be similar to the operations of like numbered blocks described with reference to FIG. 6. In response to determining that the dequeued task is a specialized version of a multi-versioned task (i.e., determination block 604="Yes") and determining that the multi-versioned task is not already owned and/or completed by another processing unit (i.e., optional determination block 606="No"), the processing unit may determine whether there are one or more priority tasks in the task queue in determination block 802. For example, the processing unit may analyze the type and function of any other tasks currently enqueued in the task queue to determine whether any correspond to codes, functions, and/or activities pre-defined as priority for the processing unit. As another example, a GPU processing unit may determine whether any display and/or rendering related tasks are currently enqueued. In some embodiments, priority tasks, multi-versioned tasks, and regular tasks may all be within a same priority queue. In some embodiments, priority tasks may be in a different queue than multi-versioned tasks and other tasks, and the processing unit may be configured to process tasks in the priority queue before processing tasks in a non-priority queue.

In response to determining that there are no priority tasks in the task queue (i.e., determination block 802="No"), the processing unit may request ownership over the multi-versioned task associated with the dequeued specialized version in block 608.

In response to determining that there is at least one priority task in the task queue (i.e., determination block 802="Yes"), the processing unit may postpone processing the dequeued specialized version of the multi-versioned task in order to process the priority task(s) first. In block 804, the processing unit may dequeue and execute the one or more priority tasks. In some embodiments, the processing unit may execute the priority tasks one at a time or alternatively in a batch. In block 806, the processing unit may push the specialized version of the multi-versioned task back onto the task queue. In some embodiments, other tasks that were dequeued to retrieve the priority tasks may also need to be pushed back onto the task queue in order. The multi-processor computing device may dequeuer the next task to be executed by the processing unit in block 602.

In some embodiments, the operations of blocks 804-806 may only be performed in response to the processing unit determining that there are no dependencies or restrictions that may require a particular execution order. For example, the processing unit may only dequeue and execute the priority tasks before the specialized version of the multi-versioned task in response to determining that the priority tasks are not dependent upon the multi-versioned task and/or other tasks within the queue that are before the priority tasks.

Figure 9:
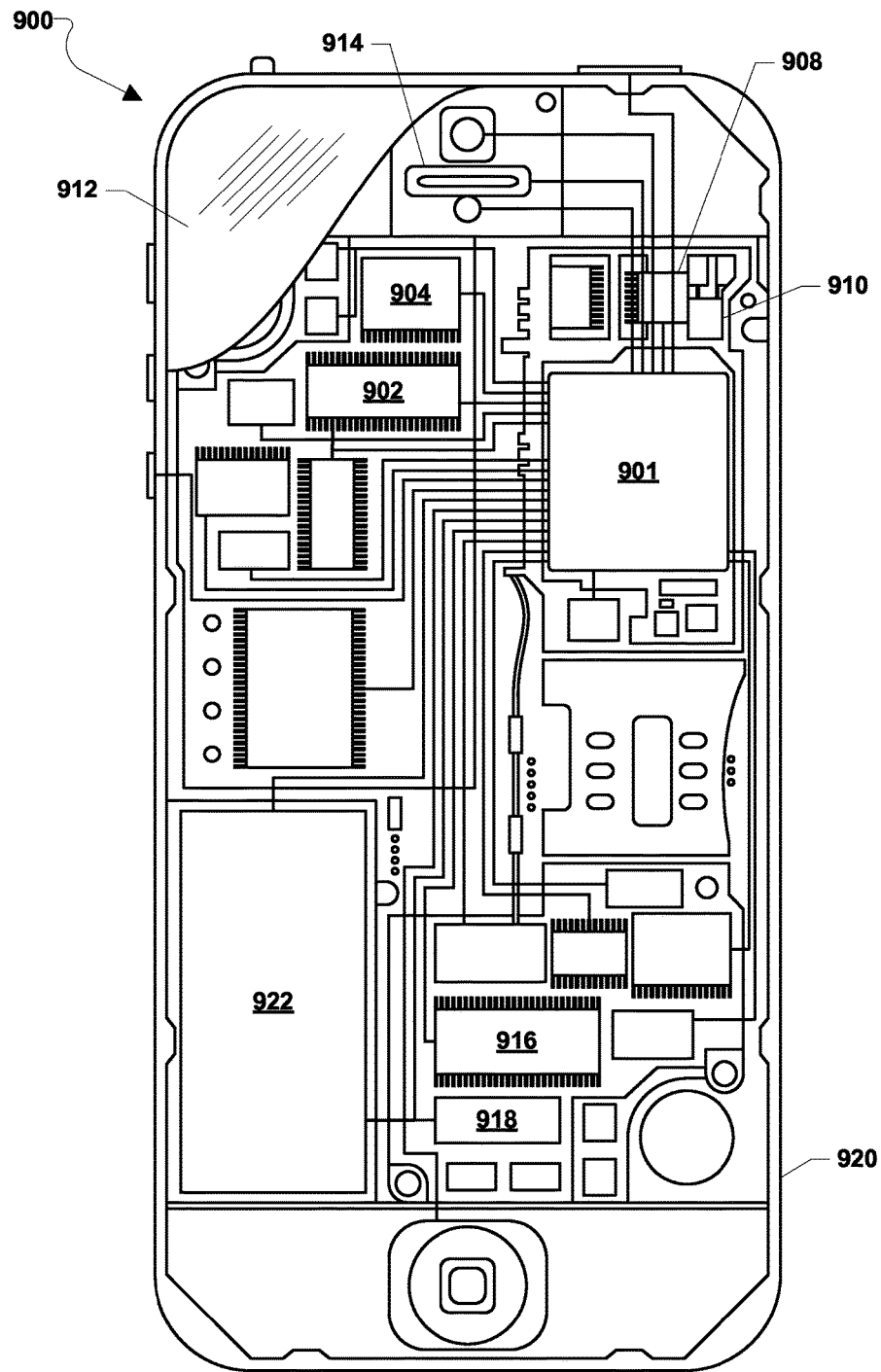
FIG. 9 is a component block diagram of a multi-processor computing device suitable for use in some embodiments.

Various forms of multi-processor computing devices, including personal computers, mobile devices, and laptop computers, may be used to implement the various embodiments. Such computing devices may typically include the components illustrated in FIG. 9 which illustrates an example multi-processor mobile device 900. In various embodiments, the mobile device 900 may include a processor 901 coupled to a touch screen controller 904 and an internal memory 902. The processor 901 may include a plurality of multi-core ICs designated for general or specific processing tasks. In some embodiments, other processing units may also be included and coupled to the processor 901 (e.g., GPU, DSP, etc.).

The internal memory 902 may be volatile and/or non-volatile memory, and may also be secure and/or encrypted memory, or unsecure and/or unencrypted memory, or any combination thereof. The touch screen controller 904 and the processor 901 may also be coupled to a touch screen panel 912, such as a resistive-sensing touch screen, capacitive-sensing touch screen, infrared sensing touch screen, etc. The mobile device 900 may have one or more radio signal transceivers 908 (e.g., Bluetooth®, ZigBee®, Wi-Fi®, RF radio) and antennae 910, for sending and receiving, coupled to each other and/or to the processor 901. The transceivers 908 and antennae 910 may be used with the above-mentioned circuitry to implement the various wireless transmission protocol stacks and interfaces. The mobile device 900 may include a cellular network wireless modem chip 916 that enables communication via a cellular network and is coupled to the processor 901. The mobile device 900 may include a peripheral device connection interface 918 coupled to the processor 901. The peripheral device connection interface 918 may be singularly configured to accept one type of connection, or multiply configured to accept various types of physical and communication connections, common or proprietary, such as USB, FireWire, Thunderbolt, or PCIe. The peripheral device connection interface 918 may also be coupled to a similarly configured peripheral device connection port (not shown). The mobile device 900 may also include speakers 914 for providing audio outputs. The mobile device 900 may also include a housing 920, constructed of a plastic, metal, or a combination of materials, for containing all or some of the components discussed herein. The mobile device 900 may include a power source 922 coupled to the processor 901, such as a disposable or rechargeable battery. The rechargeable battery may also be coupled to the peripheral device connection port to receive a charging current from a source external to the mobile device 900.

Various processors (or processing units) described herein may be any programmable microprocessor, microcomputer or multiple processor chip or chips that may be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic data storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray Disc® where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the embodiment techniques of the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for a multi-processor computing device to schedule multi-versioned tasks on a plurality of processing units, comprising:

enqueuing, via a processor of the plurality of processing units, a pointer associated with a specialized version of a multi-versioned task in a task queue for each of the plurality of processing units, wherein each pointer includes an identification of the multi-versioned task and the specialized version of the multi-versioned task, and further wherein each specialized version is configured to be executed by a different processing unit of the plurality of processing units;

providing, via the processor, ownership over the multi-versioned task to a first processing unit of the plurality of processing units, wherein the first processing unit is available to immediately execute a first specialized version of the multi-versioned task before other processing units of the plurality of processing units are available to execute other specialized versions of the multi-versioned task; and discarding, via the processor, the other specialized versions of the multi-versioned task in response to providing the ownership over the multi-versioned task to the first processing unit.

2. The method of claim 1, wherein the multi-processor computing device is executing a runtime functionality configured to schedule the plurality of processing units.

3. The method of claim 1, wherein the identification of the specialized version of the multi-versioned task is included in a lowest four bits of each pointer.

4. The method of claim 1, wherein providing, via the processor, the ownership over the multi-versioned task to the first processing unit of the plurality of processing units comprises storing data in association with the multi-versioned task.

5. The method of claim 1, further comprising:
determining, via the processor, whether a next task from the task queue of the first processing unit is associated with the multi-versioned task; and
requesting, via the processor, the ownership over the multi-versioned task for the first processing unit in response to determining that the next task is associated with the multi-versioned task.

6. The method of claim 5, further comprising:
acquiring, via the processor, the ownership over the multi-versioned task for the first processing unit in response to requesting the ownership; and
executing, via the first processing unit, the next task in response to acquiring the ownership over the multi-versioned task for the first processing unit.

7. The method of claim 5, wherein determining, via the processor, whether the next task from the task queue of the first processing unit is associated with the multi-versioned task comprises:
obtaining, via the processor, an identifier by applying a bit mask to a pointer from the task queue of the first processing unit; and
determining, via the processor, that the next task is associated with the multi-versioned task in response to determining that the identifier corresponds to the first specialized version of the multi-versioned task.

8. The method of claim 5, wherein determining, via the processor, whether the next task from the task queue of the first processing unit is associated with the multi-versioned task comprises:
retrieving, via the processor, a pointer from the task queue of the first processing unit, wherein the pointer is a common multi-versioned task pointer placed in the task queue for each of the plurality of processing units;
determining, via the processor, whether the pointer is associated with a list of specialized versions of the multi-versioned task; and
identifying, via the processor, the first specialized version of the multi-versioned task from the list of specialized versions of the multi-versioned task in response to determining that the pointer is associated with the list of specialized versions of the multi-versioned task, wherein the first specialized version is the next task to be executed by the first processing unit.

9. The method of claim 5, further comprising:
executing, via the first processing unit, the next task in response to determining that the next task is not associated with the multi-versioned task.

10. The method of claim 5, further comprising:
determining, via the processor, that the ownership over the multi-versioned task has been acquired by a second processing unit in response to requesting the ownership for the first processing unit; and
discarding, via the processor, the next task in response to determining that the ownership over the multi-versioned task has been acquired by the second processing unit.

11. The method of claim 5, further comprising:
determining, via the processor, whether there is a priority task within the task queue associated with the first processing unit; and
executing, via the first processing unit, the priority task, wherein requesting, via the processor, the ownership over the multi-versioned task for the first processing unit in response to determining that the next task is associated with the multi-versioned task comprises requesting, via the processor, the ownership over the multi-versioned task for the first processing unit in response to executing the priority task.

12. The method of claim 1, wherein the processor is the first processing unit.

13. A multi-processor computing device, comprising:
a memory; and
a plurality of processing units coupled to the memory, wherein a processor of the plurality of processing units is configured with processor-executable instructions to perform operations comprising:
enqueuing a pointer associated with a specialized version of a multi-versioned task in a task queue for each of the plurality of processing units, wherein each pointer includes an identification of the multi-versioned task and the specialized version of the multi-versioned task, and further wherein each specialized version is configured to be executed by a different processing unit of the plurality of processing units;
providing ownership over the multi-versioned task to a first processing unit of the plurality of processing units, wherein the first processing unit is available to immediately execute a first specialized version of the multi-versioned task before other processing units of the plurality of processing units are available to execute other specialized versions of the multi-versioned task; and
discarding the other specialized versions of the multi-versioned task in response to providing the ownership over the multi-versioned task to the first processing unit.

14. The multi-processor computing device of claim 13, wherein the processor is configured to perform the operations when the multi-processor computing device is executing a runtime functionality configured to schedule the plurality of processing units.

15. The multi-processor computing device of claim 13, wherein the processor is configured with processor-executable instructions to perform operations such that the identification of the specialized version of the multi-versioned task is included in a lowest four bits of each pointer.

16. The multi-processor computing device of claim 13, wherein the processor is configured with processor-executable instructions to perform operations such that providing the ownership over the multi-versioned task to the first processing unit of the plurality of processing units comprises storing data in association with the multi-versioned task.

17. The multi-processor computing device of claim 13, wherein the processor is configured with processor-executable instructions to perform operations further comprising:
  determining whether a next task from the task queue of the first processing unit is associated with the multi-versioned task; and
  requesting the ownership over the multi-versioned task for the first processing unit in response to determining that the next task is associated with the multi-versioned task.

18. The multi-processor computing device of claim 17, wherein the processor is configured with processor-executable instructions to perform operations further comprising:
  acquiring the ownership over the multi-versioned task for the first processing unit in response to requesting the ownership; and
  executing the next task via the first processing unit in response to acquiring the ownership over the multi-versioned task.

19. The multi-processor computing device of claim 17, wherein the processor is configured with processor-executable instructions to perform operations such that determining whether the next task from the task queue of the first processing unit is associated with the multi-versioned task comprises:
  obtaining an identifier by applying a bit mask to a pointer from the task queue of the first processing unit; and
  determining that the next task is associated with the multi-versioned task in response to determining that the identifier corresponds to the first specialized version of the multi-versioned task.

20. The multi-processor computing device of claim 17, wherein the processor is configured with processor-executable instructions to perform operations such that determining whether the next task from the task queue of the first processing unit is associated with the multi-versioned task comprises:
  retrieving a pointer from the task queue of the first processing unit, wherein the pointer is a common multi-versioned task pointer placed in the task queue for each of the plurality of processing units;
  determining whether the pointer is associated with a list of specialized versions of the multi-versioned task; and
  identifying the first specialized version of the multi-versioned task from the list of specialized versions of the multi-versioned task in response to determining that the pointer is associated with the list of specialized versions of the multi-versioned task, wherein the first specialized version is the next task to be executed by the first processing unit.

21. The multi-processor computing device of claim 17, wherein the processor is configured with processor-executable instructions to perform operations further comprising:
executing the next task via the first processing unit in response to determining that the next task is not associated with the multi-versioned task.

22. The multi-processor computing device of claim 17, wherein the processor is configured with processor-executable instructions to perform operations further comprising:
  determining that the ownership over the multi-versioned task has been acquired by a second processing unit in response to requesting the ownership over the multi-versioned task for the first processing unit; and
  discarding the next task in response to determining that the ownership over the multi-versioned task has been acquired by the second processing unit.

23. The multi-processor computing device of claim 17, wherein the processor is configured with processor-executable instructions to perform operations further comprising:
  determining whether there is a priority task within the task queue associated with the first processing unit; and
  executing the priority task via the first processing unit, wherein requesting the ownership over the multi-versioned task for the first processing unit comprises requesting the ownership over the multi-versioned task for the first processing unit in response to executing the priority task.

24. A non-transitory processor-readable storage medium having stored thereon processor-executable instructions configured to cause a processor of a multi-processor computing device to perform operations comprising:
  enqueuing a pointer associated with a specialized version of a multi-versioned task in a task queue for each of the plurality of processing units, wherein each pointer includes an identification of the multi-versioned task and the specialized version of the multi-versioned task, and further wherein each specialized version is configured to be executed by a different processing unit of the plurality of processing units;
  providing ownership over the multi-versioned task to a first processing unit of the plurality of processing units, wherein the first processing unit is available to immediately execute a first specialized version of the multi-versioned task before other processing units of the plurality of processing units are available to execute other specialized versions of the multi-versioned task; and
  discarding the other specialized versions of the multi-versioned task in response to providing the ownership over the multi-versioned task to the first processing unit.

25. A multi-processor computing device, comprising:
  means for enqueuing a pointer associated with a specialized version of a multi-versioned task in a task queue for each of the plurality of processing units, wherein each pointer includes an identification of the multi-versioned task and the specialized version of the multi-versioned task, and further wherein each specialized version is configured to be executed by a different processing unit of the plurality of processing units;
  means for providing ownership over the multi-versioned task to a first processing unit of the plurality of processing units, wherein the first processing unit is available to immediately execute a first specialized version of the multi-versioned task before other processing units of the plurality of processing units are available to execute other specialized versions of the multi-versioned task; and means for discarding the other specialized versions of the multi-versioned task in response to providing ownership over the multi-versioned task to the first processing unit.

\* \* \* \* \*